United States Patent
Hara et al.

(10) Patent No.: US 10,551,978 B2
(45) Date of Patent: Feb. 4, 2020

(54) CONDUCTIVE FILM FOR TOUCH PANEL, TOUCH PANEL, AND TOUCH PANEL-EQUIPPED DISPLAY DEVICE

(71) Applicant: FUJIFILM Corporation, Tokyo (JP)

(72) Inventors: Daisuke Hara, Ashigarakami-gun (JP); Hiroshige Nakamura, Ashigarakami-gun (JP); Kensuke Katagiri, Ashigarakami-gun (JP); Masaya Nakayama, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 62 days.

(21) Appl. No.: 15/851,105

(22) Filed: Dec. 21, 2017

(65) Prior Publication Data
US 2018/0113347 A1 Apr. 26, 2018

Related U.S. Application Data

(63) Continuation of application No. PCT/JP2016/054754, filed on Feb. 18, 2016.

(30) Foreign Application Priority Data

Jul. 24, 2015 (JP) ................................. 2015-147087

(51) Int. Cl.
*G06F 3/044* (2006.01)

(52) U.S. Cl.
CPC .... *G06F 3/044* (2013.01); *G06F 2203/04112* (2013.01)

(58) Field of Classification Search
CPC ........... G06F 3/044; G06F 2203/04107; G06F 2203/04112
See application file for complete search history.

(56) References Cited

U.S. PATENT DOCUMENTS

2013/0207911 A1* 8/2013 Barton ................. G06F 3/0488
345/173
2013/0343010 A1* 12/2013 Hwang ................. G06F 3/041
361/748

(Continued)

FOREIGN PATENT DOCUMENTS

CN 104106024 A 10/2014
JP 2013-127658 A 6/2013

(Continued)

OTHER PUBLICATIONS

Japanese Notification of Reasons for Refusal for corresponding Japanese Application No. 2017-531029, dated Feb. 12, 2019, with English translation.

(Continued)

*Primary Examiner* — Liliana Cerullo
(74) *Attorney, Agent, or Firm* — Birch, Stewart, Kolasch & Birch, LLP

(57) ABSTRACT

A conductive sheet for a touch panel having an active area includes a first conductive layer that is formed of a first thin metal wire disposed in the active area; and a second conductive layer that is formed of a second thin metal wire disposed to overlap with the first conductive layer in the active area, in which a mesh pattern is formed of the first thin metal wire and the second thin metal wire in a case where the conductive sheet is seen from a direction perpendicular to the active area, the mesh pattern is a random pattern, an average line width of the first thin metal wire and the second thin metal wire is 0.5 μm to 3.5 μm, and an opening ratio of the mesh pattern is (92.3+X×1.6)% to 99.6%. X represents the average line width of the first and the second thin metal wire.

11 Claims, 5 Drawing Sheets

(56) References Cited

U.S. PATENT DOCUMENTS

| | | | | |
|---|---|---|---|---|
| 2014/0111711 A1* | 4/2014 | Iwami | ..................... | B32B 7/02 |
| | | | | 349/12 |
| 2014/0356584 A1 | 12/2014 | Yang et al. | | |
| 2015/0170610 A1 | 6/2015 | Kurasawa et al. | | |
| 2015/0289366 A1* | 10/2015 | Frey | ..................... | G06F 3/041 |
| | | | | 174/250 |

FOREIGN PATENT DOCUMENTS

| | | |
|---|---|---|
| JP | 2013-178655 A | 9/2013 |
| JP | 2014-236006 A | 12/2014 |
| JP | 2015-108896 A | 6/2015 |
| JP | 2015-115021 A | 6/2015 |
| TW | 201342154 A | 10/2013 |
| TW | 201423773 A | 6/2014 |
| WO | WO 2014/088798 A1 | 6/2014 |
| WO | WO 2015/079862 A1 | 6/2015 |

OTHER PUBLICATIONS

International Preliminary Report on Patentability and Written Opinion of the International Searching Authority (forms PCT/IB/373, PCT/ISA/237 and PCT/IB/326), dated Feb. 8, 2018, for corresponding International Application No. PCT/JP2016/054754, with an English translation of the Written Opinion.

International Search Report (form PCT/ISA/210), dated Mar. 22, 2016, for corresponding International Application No. PCT/JP2016/054754, with an English translation.

Taiwanese Office Action and Search Report, dated Jul. 31, 2019, for Taiwanese Application No. 105107145, with an English translation.

* cited by examiner

CONDUCTIVE FILM FOR TOUCH PANEL, TOUCH PANEL, AND TOUCH PANEL-EQUIPPED DISPLAY DEVICE

CROSS-REFERENCE TO RELATED APPLICATIONS

This application is a Continuation of PCT International Application No. PCT/JP2016/054754 filed on Feb. 18, 2016, which claims priority under 35 U.S.C. § 119(a) to Japanese Patent Application No. 2015-147087 filed on Jul. 24, 2015. Each of the above application(s) is hereby expressly incorporated by reference, in its entirety, into the present application.

BACKGROUND OF THE INVENTION

1. Field of the Invention

The present invention relates to a conductive film for a touch panel, a touch panel, and a touch panel-equipped display device.

2. Description of the Related Art

Recently, in various electronic apparatuses such as a portable information apparatus, the use of a touch panel has increased, the touch panel being used in combination with a display device such as a liquid crystal display device and performing an input operation on an electronic apparatus when a screen is touched. Since the costs and the resistance can be reduced, a touch panel using a detecting electrode formed of a metal mesh has been developed.

A metal mesh is formed of a thin metal wire having a mesh-like pattern. For example, a detecting electrode formed of a metal mesh is disposed on each of opposite surfaces of a transparent substrate.

For example, JP2013-127658A discloses a conductive sheet (conductive film) having an electrode pattern formed of a thin metal wire. JP2013-127658A specifically discloses an electrode having a fixed mesh-like pattern formed of a substantially lozenge-shaped lattice.

SUMMARY OF THE INVENTION

On the other hand, in a case where a metal mesh has a periodic pattern as specifically disclosed in JP2013-127658A, a thin metal wire interferes with a periodic pixel pattern of a display device used in combination with a touch panel, and so-called moire is likely to occur. Therefore, it is necessary to design a mesh pattern capable of reducing moire according to a pixel pattern of a display device to be used, and there is a problem from the viewpoints of productivity and costs. More specifically, in a case where two or more display devices having different pixel patterns, in other words, having different resolutions are used, it is necessary to design a mesh pattern of a metal mesh according to each of the resolutions. Therefore, a conductive film that is applicable to display devices having different pixel patterns (resolutions) is desired.

Regarding properties required for a conductive film, not only reduction in moire but also reduction in quality deterioration called "noise" in which density unevenness is generated on a displayed image of a display device are required. In particular, in a display device having a high resolution of 300 ppi or higher, the problems of moire and noise are significant, and further improvement is required. As described above, it is desired that noise can be reduced irrespective of a pixel pattern of a display device to be used.

The present invention has been made in consideration of the above-described circumstances, and an object thereof is to provide a conductive film for a touch panel that can reduce moire and noise even when applied to display devices having different pixel patterns.

In addition, another object of the present invention is to provide a touch panel and a touch panel-equipped display device that include the conductive film for a touch panel.

As a result of thorough investigation, the present inventors found that the desired effect can be obtained by using a conductive film for a touch panel having a predetermined pattern.

That is, it was found that the object can be achieved by the following configurations.

(1) A conductive sheet for a touch panel having an active area, the conductive sheet comprising:

a first conductive layer that is formed of a first thin metal wire disposed in the active area; and a second conductive layer that is formed of a second thin metal wire disposed to overlap with the first conductive layer in the active area, in which a mesh pattern is formed of the first thin metal wire and the second thin metal wire in a case where the conductive sheet is seen from a direction perpendicular to the active area, the mesh pattern is a random pattern, an average line width of the first thin metal wire and the second thin metal wire is 0.5 µm to 3.5 µm, and in a case where X represents the average line width of the first thin metal wire and the second thin metal wire, an opening ratio of the mesh pattern is (92.3+X×1.6)% to 99.6%.

(2) The conductive sheet for a touch panel according to (1), in which the average line width of the first thin metal wire and the second thin metal wire is 1.1 µm to 2.7 µm, and the opening ratio of the mesh pattern is (92.3+X×1.6)% to (99.95−X×0.33)%, and preferably, in which the average line width of the first thin metal wire and the second thin metal wire is 1.1 µm to 2.7 µm, and the opening ratio of the mesh pattern is (95.2+X×0.8)% to (99.95−X×0.33)%.

(3) The conductive sheet for a touch panel according to (1) or (2), in which the first conductive layer includes a first mesh pattern formed of a plurality of first cells, the second conductive layer includes a second mesh pattern formed of a plurality of second cells, and each of the second cells includes at most one apex of the first cells in a case where the conductive sheet is seen from the direction perpendicular to the active area.

(4) The conductive sheet for a touch panel according to any one of (1) to (3), in which the first conductive layer includes a first mesh pattern formed of a plurality of first cells, the first mesh pattern is a random pattern, the second conductive layer includes a second mesh pattern formed of a plurality of second cells, and the second mesh pattern is a random pattern.

(5) The conductive sheet for a touch panel according to (4), in which an opening ratio of the first mesh pattern is lower than an opening ratio of the second mesh pattern.

(6) The conductive sheet for a touch panel according to any one of claims (1) to (5), in which a value of the active area obtained from evaluation of opening ratio uniformity described below is 0.4% or lower.

(7) The conductive sheet for a touch panel according to any one of (1) to (6), wherein a visible light reflectivity of each of a visible side surface of the first thin metal wire and a visible side surface of the second thin metal wire is 5% or lower.

(8) The conductive sheet for a touch panel according to any one of claims 1 to 7, the conductive sheet further comprising a substrate that includes a first surface and a second surface facing the first surface, in which the first conductive layer is disposed on the first surface, and the second conductive layer is disposed on the second surface.

(9) The conductive sheet for a touch panel according to any one of (1) to (8), in which the first conductive layer forms a plurality of first electrodes and a plurality of first dummy electrodes, the first electrodes are disposed at intervals, the first dummy electrodes are disposed between the first electrodes and are insulated from the first electrodes, the second conductive layer forms a plurality of second electrodes and a plurality of second dummy electrodes, the second electrodes are disposed at intervals to intersect with the first electrodes, the second dummy electrodes are disposed between the second electrodes and are insulated from the second electrodes, and the first electrodes and the second electrodes are disposed in a state where the first electrodes and the second electrodes are insulated from each other.

(10) A touch panel comprising:

the conductive sheet for a touch panel according to any one of (1) to (9).

(11) A touch panel-equipped display device comprising:

the touch panel according to (10); and a display device having a resolution in a range of 106 to 423 ppi.

(12) The touch panel-equipped display device according to (11), in which the touch panel includes a conductive sheet for a touch panel having a mesh pattern which is common to display devices having different resolutions in a range of 106 to 423 ppi.

According to the present invention, it is possible to provide a conductive sheet for a touch panel that can reduce moire and noise even when applied to display devices having different pixel patterns.

In addition, according to the present invention, it is possible to provide a touch panel and a touch panel-equipped display device that include the conductive sheet for a touch panel.

DESCRIPTION OF THE PREFERRED EMBODIMENTS

Figure 1:
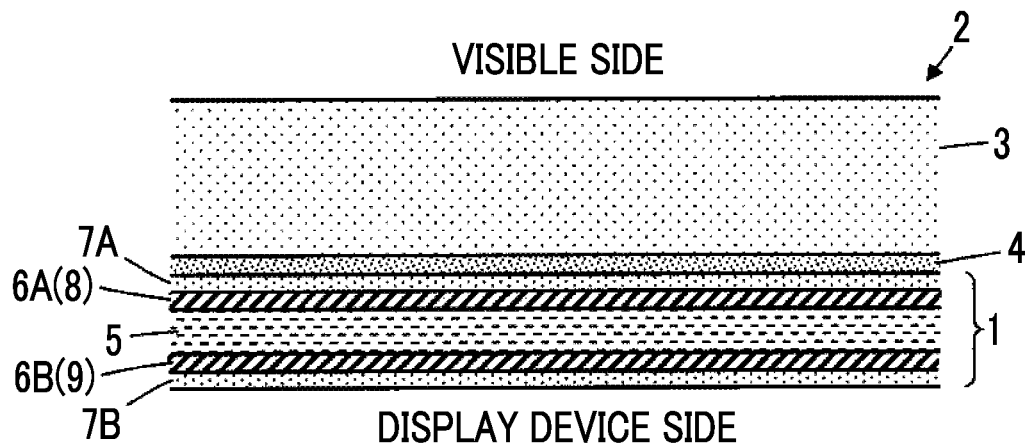
FIG. 1 is a partial cross-sectional view showing a touch panel using an embodiment of a conductive film for a touch panel according to the present invention.

FIG. 1 shows a configuration of a touch panel (capacitive touch panel) 2 using one embodiment of a conductive film 1 for a touch panel according to the present invention. The touch panel 2 is used in combination with a display device, and the display device is disposed on a display device side of FIG. 1. A visible side shown in FIG. 1 refers to a side where an operator of the touch panel can see an image of the display device. The touch panel 2 includes a transparent insulating cover panel 3 having a flat plate shape, and the conductive film 1 for a touch panel is joined to a surface of the cover panel 3 opposite to the visible side through a transparent pressure sensitive adhesive 4. In the conductive film 1 for a touch panel, conductive members 6A (first conductive layer 8) and 6B (second conductive layer 9) are formed on opposite surfaces of a flexible transparent insulating substrate 5, respectively. Each of the conductive members 6A and 6B forms at least electrodes, peripheral wirings, external connection terminals, and connector portions of the touch panel.

In addition, as shown in FIG. 1, for planarization or protection of the conductive members 6A and 6B, transparent protective layers 7A and 7B may be disposed on opposite surfaces of the transparent insulating substrate 5 so as to cover the conductive members 6A and 6B, respectively.

As a material of the cover panel 3, for example, reinforced glass, sapphire, polycarbonate (PC), or polymethyl methacrylate (PMMA) can be used. In addition, the thickness of the cover panel 3 is preferably 0.1 to 1.5 mm. In the cover panel 3, a decorative layer that prevents light from transmitting through a peripheral area S2 described below may be formed.

As a material of the transparent insulating substrate 5, for example, glass, polyethylene terephthalate (PET), polyethylene naphthalate (PEN), a cycloolefin polymer (COP), a cycloolefin copolymer (COC), or polycarbonate (PC) can be used. In addition, the thickness of the transparent insulating substrate 5 is preferably 20 to 200 μm.

As the transparent pressure sensitive adhesive 4, an optical transparent adhesive sheet (optical clear adhesive) or an optical transparent adhesive resin (optical clear resin) can be used, and the thickness thereof is preferably 10 to 100 μm. As the optical transparent adhesive sheet, for example, 8146 series (manufactured by 3M) can be preferably used. The relative dielectric constant of the transparent pressure sensitive adhesive 4 is preferably 4.0 to 6.0 and more preferably 5.0 to 6.0.

In this specification, numerical ranges represented by "to" include numerical values before and after "to" as lower limit values and upper limit values.

As the transparent protective layers 7A and 7B, for example, an organic film such as gelatin, an acrylic resin, or a urethane resin, or an inorganic film such as silicon dioxide can be used. The thickness is preferably 10 nm to 100 nm. The relative dielectric constant is preferably 2.5 to 4.5. Since the conductive members 6A and 6B may be corroded, a concentration of halogen impurities in the protective layers 7A and 7B is preferably 50 ppm or lower, and it is more preferable that the conductive members 6A and 6B do not include halogen impurities.

Figure 2:
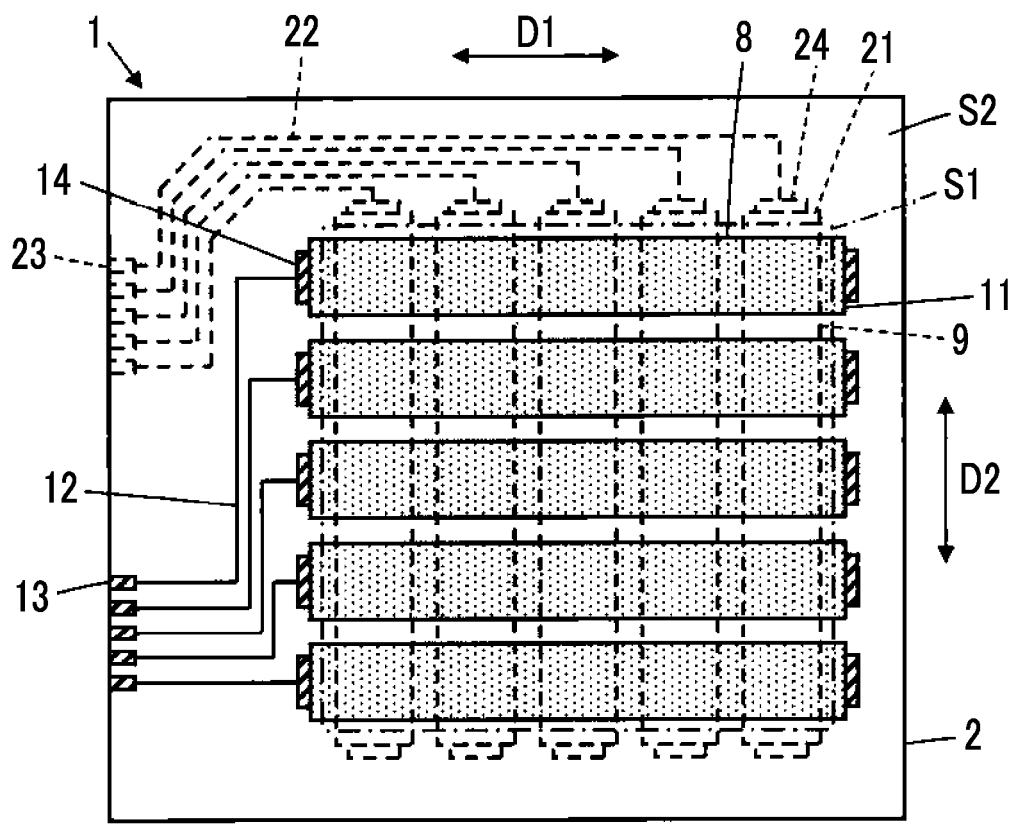
FIG. 2 is a plan view showing the conductive film for a touch panel.

As shown in FIG. 2, the conductive film 1 for a touch panel is partitioned into a transparent active area S1 and the peripheral area S2 positioned outside of the active area S1.

In the active area S1, the first conductive layer 8 and the second conductive layer 9 are disposed to overlap each other, the first conductive layer 8 being formed on a front surface (first surface) of the transparent insulating substrate 5, and the second conductive layer 9 being formed on a back surface (second surface) of the transparent insulating substrate 5. The first conductive layer 8 and the second conductive layer 9 are disposed with the transparent insulating substrate 5 interposed therebetween in a state where they are insulated from each other.

The first conductive layer 8 on the front surface of the transparent insulating substrate 5 forms a plurality of first electrodes 11 that extend in a first direction D1 and are disposed in parallel in a second direction D2 perpendicular to the first direction D1. The second conductive layer 9 on the back surface of the transparent insulating substrate 5 forms a plurality of second electrodes 21 that extend in the second direction D2 and are disposed in parallel in the first direction D1.

The first electrodes 11 and the second electrodes 21 configure a detecting electrode of the touch panel 2. An electrode width of the first electrodes 11 and the second electrodes 21 is preferably 1 to 5 mm, and an inter-electrode pitch is preferably 3 to 6 mm.

In the peripheral area S2, a plurality of first peripheral wirings 12 connected to the first electrodes 11 are formed on the front surface of the transparent insulating substrate 5, a plurality of first external connection terminals 13 are disposed and formed in an edge portion of the transparent insulating substrate 5, and first connector portions 14 are formed in opposite ends of each of the first electrodes 11. One end portion of the corresponding first peripheral wiring 12 is connected to the first connector portion 14, and the other end portion of the first peripheral wiring 12 is connected to the corresponding first external connection terminal 13.

Likewise, In the peripheral area S2, a plurality of second peripheral wirings 22 connected to the second electrodes 21 are formed on the back surface of the transparent insulating substrate 5, a plurality of second external connection terminals 23 are disposed and formed in an edge portion of the transparent insulating substrate 5, and second connector portions 24 are formed in opposite ends of each of the second electrodes 21. One end portion of the corresponding second peripheral wiring 22 is connected to the second connector portion 24, and the other end portion of the second peripheral wiring 22 is connected to the corresponding second external connection terminal 23.

The conductive film 1 for a touch panel includes the conductive member 6A including the first electrodes 11, the first peripheral wirings 12, the first external connection terminals 13, and the first connector portions 14 on the front surface of the transparent insulating substrate 5, and includes the conductive member 6B including the second electrodes 21, the second peripheral wirings 22, the second external connection terminals 23, and the second connector portions 24 on the back surface of the transparent insulating substrate 5.

In FIG. 2, the first electrodes 11 and the first peripheral wirings 12 are connected through the first connector portions 14. However, the first electrodes 11 and the first peripheral wirings 12 may be directly connected to each other without the first connector portions 14. In addition, likewise, the second electrodes 21 and the second peripheral wirings 22 may be directly connected to each other without the second connector portions 24.

The first connector portions 14 and the second connector portions 24 have an effect of improving electrical connection at connection positions between the electrodes and the peripheral wirings. In particular, in a case where a material of the electrodes is different from a material of the peripheral wirings, it is preferable that the first connector portions 14 and the second connector portions 24 are provided. It is preferable that the width of the first connector portions 14 and the second connector portions 24 is ⅓ or less of the width of the electrodes connected thereto. A shape of the first connector portions 14 and the second connector portions 24 may be a solid film shape or a mesh shape disclosed in JP2013-127658A.

The width of the first peripheral wirings 12 and the second peripheral wirings 22 is 10 μm to 200 μm, and the minimum wiring interval (minimum inter-wiring distance) thereof is preferably 20 μm to 100 μm.

A protective insulating film formed of a urethane resin, an acrylic resin, an epoxy resin, or the like may be provided on the peripheral wirings so as to cover the peripheral wirings. By providing the protective insulating film, migration, rust, and the like of the peripheral wirings can be prevented. Since the peripheral wirings may be corroded, it is preferable that the insulating film does not include halogen impurities. The thickness of the protective insulating film is preferably 1 to 20 μm.

In a case where the conductive film 1 for a touch panel is used as the touch panel, the first external connection terminals 13 and the second external connection terminals 23 are electrically connected to a flexible printed circuit through an anisotropic conductive film. The flexible printed circuit is connected to a touch panel control board having a driving function and a position detecting function.

The first external connection terminals 13 and the second external connection terminals 23 are formed to have a width larger than the width of the first peripheral wirings 12 and the second peripheral wirings 22 in order to improve electrical connection with the flexible printed circuit. Specifically, the width of the first external connection terminals 13 and the second external connection terminals 23 is preferably 0.1 mm to 0.6 mm, and the length thereof is preferably 0.5 mm to 2.0 mm.

The transparent insulating substrate 5 corresponds to a substrate that includes a first surface and a second surface facing the first surface. The first conductive layer 8 is disposed on the first surface (front surface), and the second conductive layer 9 is disposed on the second surface (back surface). FIG. 1 shows a shape in which the transparent insulating substrate 5 is in direct contact with the first conductive layer 8 and the second conductive layer 9. However, one or more functional layers such as an adhesion reinforcing layer, an undercoat layer, a hard coat layer, or an optical adjustment layer may also be formed between the transparent insulating substrate 5 and the first conductive layer 8 and between the transparent insulating substrate 5 and the second conductive layer 9.

Figure 3:
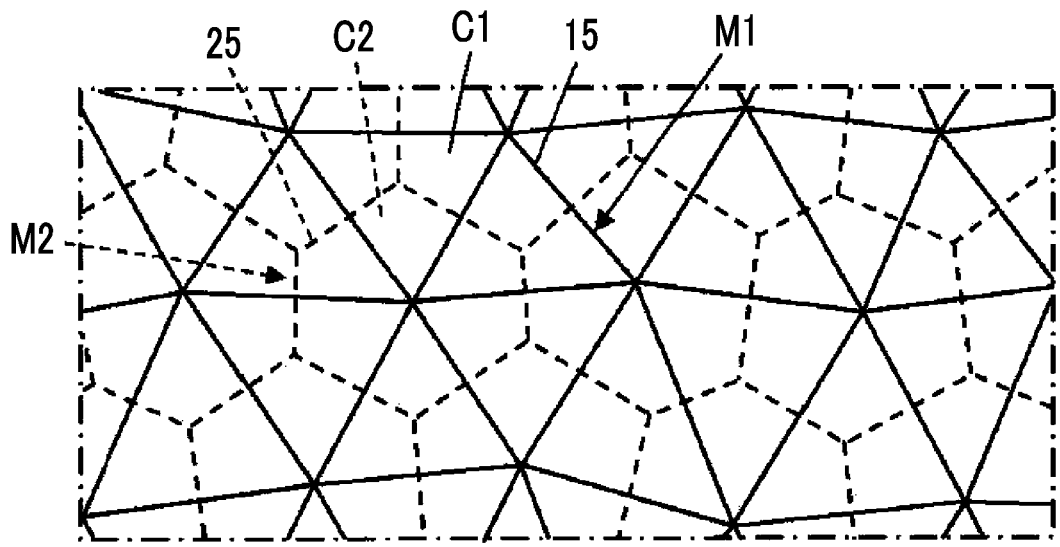
FIG. 3 is a partial plan view showing a first mesh pattern and a second mesh pattern of the conductive film used in the touch panel.

As shown in FIG. 3, the first conductive layer 8 constituting the first electrodes 11, which are disposed on the front surface of the transparent insulating substrate 5, includes a first thin metal wire 15 that is disposed along a first mesh pattern M1 formed of a plurality of first cells C1 having a polygonal shape (triangular shape). The second conductive layer 9 constituting the second electrodes 21, which are disposed on the back surface of the transparent insulating substrate 5, includes a second thin metal wire 25 that is disposed along a second mesh pattern M2 formed of a plurality of second cells C2 having a polygonal shape (hexagonal shape). That is, the first electrodes 11 include the first thin metal wire 15 disposed along the first mesh pattern M1, and the second electrodes 21 include the second thin metal wire 25 disposed along the second mesh pattern M2.

In FIG. 3, in order to easily distinguish the first thin metal wire 15 and the second thin metal wire 25 from each other, the second thin metal wire 25 is indicated by a dotted line. However, actually, the second thin metal wire 25 is formed of the same wire as the first thin metal wire 15.

Figure 4:
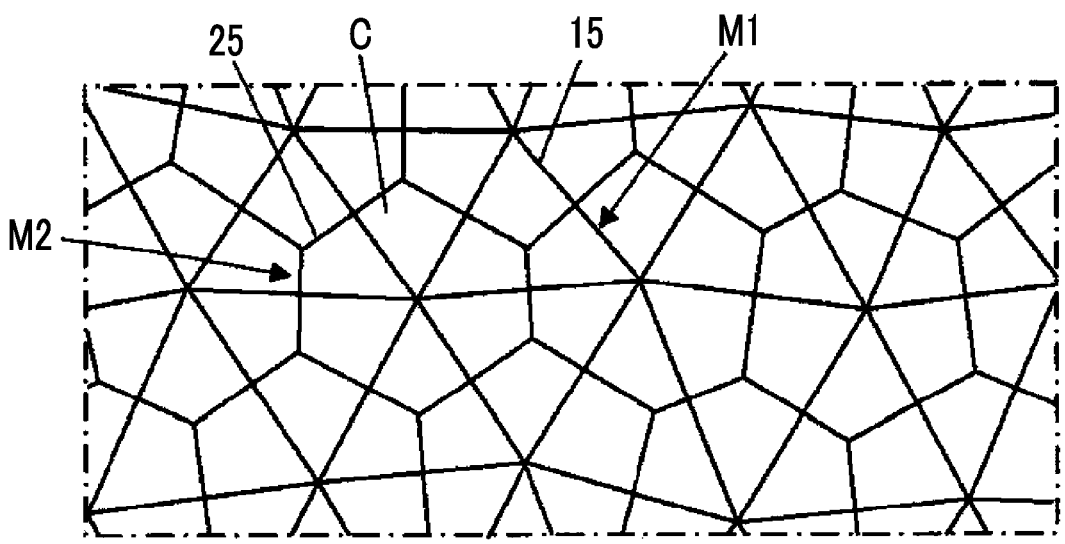
FIG. 4 is a partial plan view showing a mesh pattern S formed of a first thin metal wire and a second thin metal wire.

In FIG. 4, the second thin metal wire 25 indicated by the dotted line in FIG. 3 is indicated by a solid line. As shown in FIG. 4, in a case where the conductive film is seen from a direction perpendicular to the active area, a mesh pattern S having a plurality of cells C having a polygonal shape is formed of the first thin metal wire 15 and the second thin metal wire 25 (indicated by the solid line in FIG. 4). That is, the mesh pattern S is a pattern (synthetic mesh pattern) which is formed by the first mesh pattern M1 and the second mesh pattern M2 overlapping with each other.

In FIG. 4, the mesh pattern S is a random pattern. The random pattern denotes that, regarding shapes of the cells forming the mesh pattern, the shape of one cell is different from that of at least one cell adjacent to the cell and that the number of extending directions of sides of the cells is 10 or more. In a particularly preferable aspect, shapes of all the adjacent cells are different from each other. "Shapes of cells being different" is defined as at least one of areas of cells being different, lengths of cells being different, or polygonal shapes of cells being different. In addition, "the number of extending directions of sides of the cells are 10 or more" denotes that the number of extending directions of sides constituting the plurality of cells in the mesh pattern is 10 or more. More specifically, for example, in a mesh pattern formed of only cells having a regular hexagonal shape, the number of extending directions of sides is only 3.

That is, the mesh pattern S being a random pattern denotes that the number of extending directions of sides of the cells C is 10 or more and that the shape of one cell C is different from that of at least one cell C adjacent to the cell C. It is preferable that shapes of all the adjacent cells C are different from each other.

In other words, in FIG. 4, the first thin metal wire 15 and the second thin metal wire 25 form the mesh pattern having a plurality of subdivided polygonal openings. That is, the number of extending directions of the first thin metal wire 15 and the second thin metal wire 25 is 10 or more, and the shape of one opening is different from that of at least one opening adjacent to the opening. It is preferable that shapes of all the adjacent openings are different from each other. As in the case of cells, "shapes of openings being different" is defined as at least one of areas of openings being different, lengths of openings being different, or polygonal shapes of openings being different.

It is preferable all of the first cells C1 and the second cell C2 have random polygonal shapes. That is, the number of extending directions of sides of the first cells C1 is 10 or more, and the shape of one first cell C1 is different from that of at least one first cell C1 adjacent to the first cell C1. In addition, the number of extending directions of sides of the second cells C2 is 10 or more, and the shape of one second cell C2 is different from that of at least one second cell C2 adjacent to the second cell C2. It is more preferable that shapes of all the adjacent first cells C1 are different from each other and shapes of all the adjacent second cells C2 are different from each other. In other words, it is preferable that the first mesh pattern M1 and the second mesh pattern M2 are random patterns. That is, a configuration is preferable in which both the first mesh pattern M1 and the second mesh pattern M2 are random patterns and that shapes of all the adjacent cells among the first cells C1 and the second cells C2 have different random polygonal shapes.

In a case where the conductive film is seen from the direction perpendicular to the active area S1, each of the second cells C2 include at most one apex of the first cells. By using the mesh pattern having the above-described configuration, the parasitic capacitance of overlapping portions between the first electrodes 11 and the second electrodes 21 can be reduced, the detection sensitivity of the touch panel can be improved, and a variation between the areas of the openings of the polygonal cells C in the mesh pattern S formed of the first conductive layer 8 and the second conductive layer 9 described below can be reduced, and the roughness of the mesh can be reduced.

It is more preferable that each of the second cells C2 includes one apex of the first cells C1.

Further, in a case where the conductive film is seen from the direction perpendicular to the active area S1, the first cells C1 have a plurality of sides, the second cells C2 have a plurality of sides, and the sides of the first cells C1 intersect with the sides of the second cells C2 in a plurality of positions. In all the intersections, the sides of the first cells C1 intersect with the sides of the second cells C2 at an angle of 75 degrees to 90 degrees. That is, the sides of the first cells C1 are not adjacent to and parallel to the sides of the second cells C2 in the same direction. By using the mesh pattern having the above-described configuration, the parasitic capacitance of overlapping portions between the first electrodes 11 and the second electrodes 21 can be reduced, and the detection sensitivity of the touch panel can be improved.

The first cells C1 are formed using a plurality of triangles having a random shape which are tightly disposed in the active area S1. The first cells C1 include: first cells C1 having a triangular shape as it is; and first cells C1 having a polygonal shape with four or more apexes in which at least portions of a plurality of adjacent triangles are merged.

From the viewpoint of improving the uniformity of the transmittance of the conductive film, improving the uniformity of resistance values, and reducing the roughness of the mesh, it is preferable that the mesh pattern S is formed of the cells C including mainly a plurality of quadrangles or including mainly a plurality of quadrangles and a plurality of pentagons. "Including mainly" denotes that the cells C account for 90% or higher in all the cells of the mesh pattern S.

It is preferable that the first mesh pattern M1 is formed of the first cells C1 including mainly a plurality of triangles or including mainly a plurality of quadrangles and a plurality of triangles and that the second mesh pattern M2 is formed of the second cells C2 including mainly a plurality of hexagons.

The first mesh pattern M1 which is formed of the first cells C1 including mainly a plurality of triangles and the second mesh patterns M2 which is formed of the second cells C2 including mainly a plurality of hexagons are disposed to overlap with each other such that each of the second cells C2 includes one apex of the first cells C1. As a result, the mesh pattern S which is formed of the cells C including mainly a plurality of quadrangles can be formed.

In addition, the first mesh pattern M1 which is formed of the first cells C1 including mainly a plurality of quadrangles and a plurality of triangles and the second mesh patterns M2 which is formed of the second cells C2 including mainly a plurality of hexagons are disposed to overlap with each other such that each of the second cells C2 includes one apex of the first cells C1. As a result, the mesh pattern S which is formed of the cells C including mainly a plurality of quadrangles and a plurality of pentagons can be formed.

The opening ratio of the first mesh pattern M1 (opening ratio when the first thin metal wire is disposed along the first mesh pattern M1) is not particularly limited and, from the viewpoint of mesh appearance and haze, is preferably 94.0% or higher, more preferably 97.0% or higher, and still more preferably 98.0% or higher. The upper limit is not particularly limited and is 99.95% or lower in many cases.

The opening ratio refers to a ratio of the area of first openings surrounded by the first thin metal wire 15 to the surface area of the first conductive layer 8 (the area of a region where the first conductive layer 8 is formed), and refers to a non-occupancy rate of the thin metal wire in the first conductive layer 8.

As described above, the first mesh pattern M1 includes a plurality of first cells C1. In the first conductive layer 8, the first thin metal wire 15 having a predetermined width is disposed along the first mesh pattern M1. In the first conductive layer 8, portions that are surrounded by the first thin metal wire 15 and where the first thin metal wire 15 is not present will be referred to as the first openings.

The opening ratio of the second mesh pattern M2 (opening ratio when the second thin metal wire is disposed along the second mesh pattern M2) is not particularly limited, and a preferable range thereof is, for example, the same as the preferable range of the opening ratio of the first mesh pattern M1.

The opening ratio of the second mesh pattern M2 refers to a ratio of the area of second openings surrounded by the second thin metal wire 25 to the surface area of the second conductive layer 9 (the area of a region where the second conductive layer 9 is formed), and refers to a non-occupancy rate of the thin metal wire in the second conductive layer 9.

As described above, the second mesh pattern M2 includes a plurality of second cells C2. In the second conductive layer 9, the second thin metal wire 25 having a predetermined width is disposed along the second mesh pattern M2. In the second conductive layer 9, portions that are surrounded by the second thin metal wire 25 and where the second thin metal wire 25 is not present will be referred to as the second openings.

The opening ratio of the first mesh pattern M1 may be the same as the opening ratio of the second mesh pattern M2. From the viewpoint of adjusting the sheet resistance of the conductive layer, it is preferable that the opening ratio of the first mesh pattern M1 is lower than the opening ratio of the second mesh pattern M2.

In a case where the opening ratio of the first mesh pattern M1 is lower than the opening ratio of the second mesh pattern M2, and in a case where the first conductive layer 8 and the second conductive layer 9 are formed of the same conductive material and have the same thickness, the sheet resistance of the first electrodes 11l can be made to be lower than the sheet resistance of the second electrodes 21. That is, the sheet resistance of the first electrodes 11 and the sheet resistance of the second electrodes 21 can be made to be different from each other. For example, in a projected capacitive touch panel including a driving electrode and a detecting electrode, it is required that the sheet resistance of the driving electrode is lower than that of the detecting electrode. In this case, the first electrodes 11 having the first mesh pattern M1 can be used as the driving electrode, and the second electrodes 21 having the second mesh pattern M2 can be used as the detecting electrode. In a touch panel, an electrode required to have a low sheet resistance varies depending on a detecting method or a pattern shape of electrodes. Therefore, the first electrodes 11 and the second electrodes 21 can be selectively used depending on each case.

Next, a relationship between the average line width of the first thin metal wire 15 and the second thin metal wire 25 and the opening ratio of the mesh pattern S will be described with reference to FIG. 5.

Figure 5:
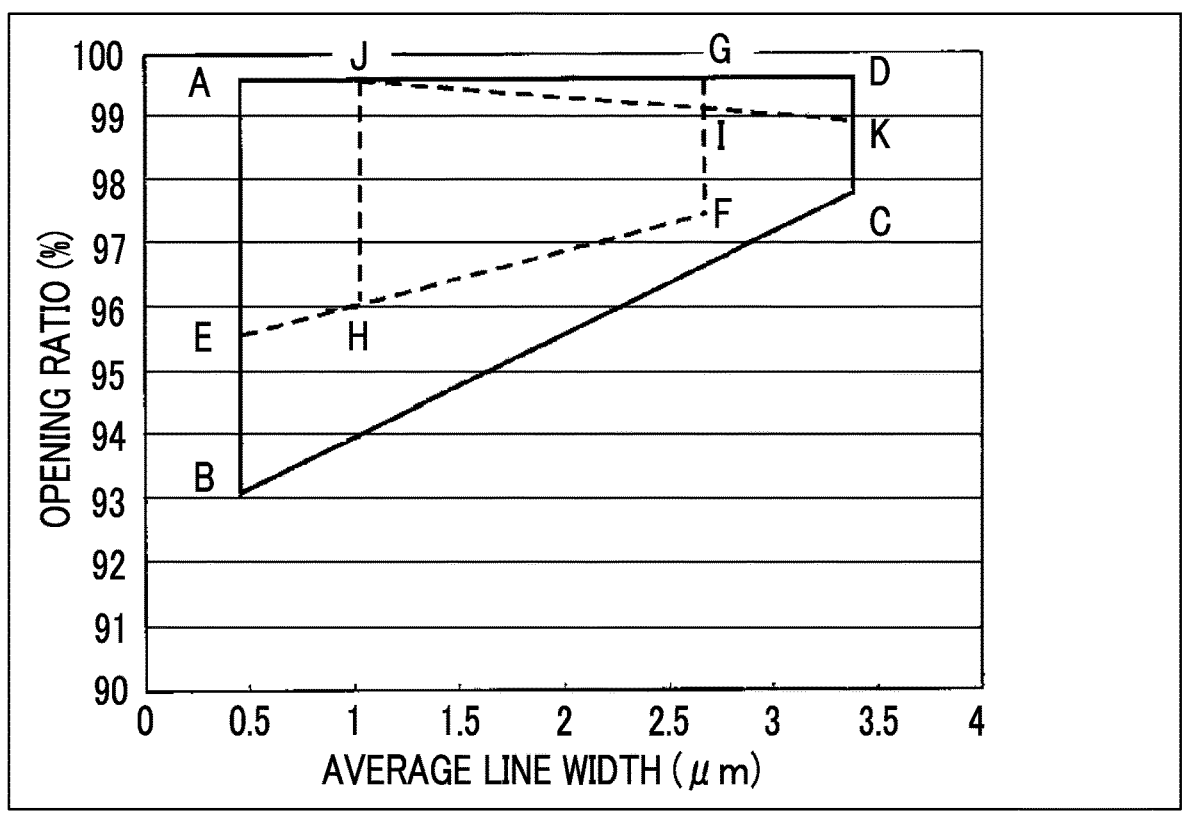
FIG. 5 is a diagram showing a relationship between an average line width of the first thin metal wire and the second thin metal wire and an opening ratio of the mesh pattern S.

In FIG. 5, the horizontal axis represents the average line width of the first thin metal wire 15 and the second thin metal wire 25, and the vertical axis represents the opening ratio of the mesh pattern S.

The average line width of the first thin metal wire 15 and the second thin metal wire 25 is 0.5 µm to 3.5 µm. That is, in FIG. 5, the range refers to a range surrounded by a line (line A-B) which connects a point A and a point B and a line (line C-D) which connects a point C and a point D.

The average line width of the first thin metal wire 15 and the second thin metal wire 25 is the average of the line width of the first thin metal wire 15 and the line width of the second thin metal wire 25. Regarding a calculating method, in a 35 mm (length)×35 mm (width) area at the center of the active area S1 of the conductive film 1 for a touch panel, a 30 mm×30 mm area at the center is divided into nine 10 mm×10 mm areas. Next, in each of the divided areas, three line widths of the first thin metal wire 15 and three line widths of the second thin metal wire 25 are measured, and the six measured values are averaged to calculate an average value thereof. By performing this operation on all the nine areas, the average values obtained in the areas are further averaged, and the obtained average value is set as the average line width of the first thin metal wire 15 and the second thin metal wire 25.

In addition, the opening ratio of the mesh pattern S which is formed of the first thin metal wire 15 and the second thin metal wire 25 (the opening ratio when the first thin metal wire and the second thin metal wire are disposed along the mesh pattern S) is (92.3+X×1.6)% to 99.6%. That is, in FIG. 5, the range refers to a range surrounded by a line (line B-C) which connects the point B and the point C and a line (line A-D) which connects the point A and the point D.

X represents the average line width of the first thin metal wire 15 and the second thin metal wire 25.

In a case where the conductive film 1 for a touch panel is seen from the direction perpendicular to the active area S1, the opening ratio refers to a ratio of the area of openings surrounded by the first thin metal wire 15 and the second thin metal wire 25 to the area of regions where the first conductive layer 8 and the second conductive layer 9 are present, and refers to a non-occupancy rate of the thin metal wires in the regions where the first conductive layer 8 and the second conductive layer 9 are present.

The mesh pattern S includes a plurality of cells C, and the first thin metal wire 15 having a predetermined width and the second thin metal wire 25 having a predetermined width are disposed along the mesh pattern S. Portions that are surrounded by the first thin metal wire 15 and the second thin metal wire 25 and where the first thin metal wire 15 and the second thin metal wire 25 are not present will be referred to as "the openings".

Regarding a method of calculating the opening ratio, in a 35 mm (length)×35 mm (width) quadrangular area at the center of the active area S1 of the conductive film 1 for a touch panel, a 30 mm×30 mm area at the center is divided into nine 10 mm×10 mm areas. Next, opening ratios of the divided areas are calculated, and the average of the measured values is set as the opening ratio of the mesh pattern S.

As described above, in the conductive film 1 for a touch panel according to the present invention, the average line width of the first thin metal wire 15 and the second thin metal wire 25, and the opening ratio of the mesh pattern S are present in a range surrounded by the line A-B, the line B-C, the line C-D, and the line A-D in FIG. 5.

In particular, from the viewpoint of further improving the effects of the present invention, it is preferable that the average line width of the first thin metal wire 15 and the second thin metal wire 25 is 0.5 μm to 2.7 μm and that the opening ratio of the mesh pattern S is (95.2+X×0.8)% to 99.6%. That is, in FIG. 5, examples of a preferable range include a range surrounded by a line (line A-E) which connects the point A and a point E, a line (line E-F) which connects the point E and a point F, a line (line F-G) which connects the point F and a point and a line (line A-G) which connects the point A and the point G.

Further, from the viewpoint of further reducing moire and noise, the viewpoint of further suppressing the visibility of the mesh pattern, and the viewpoint of manufacturing suitability and resistance value, it is preferable that the average line width of the first thin metal wire 15 and the second thin metal wire 25 is 1.1 μm to 2.7 μm and that the opening ratio of the mesh pattern S is (95.2+X×0.8)% to (99.95−X×0.33) %. That is, in FIG. 5, examples of a preferable range include a range surrounded by a line (line J-H) which connects a point J and a point H, a line (line H-F) which connects the point H and the point F, a line (line F-I) which connects the point F and a point I, and a line (line I-J) which connects the point I and the point J.

By adjusting the opening ratio of the mesh pattern S to (99.95−X×0.33)% or lower, the visibility of the mesh pattern S can be suppressed. That is, in a case where the opening ratio of the mesh pattern S is lower than the line J-K in FIG. 5, the visibility of the mesh pattern can be further suppressed. In a case where the average line width is 1.1 μm or more, an increase in the resistance value of the electrodes and disconnection of the thin metal wires can be reduced.

The first conductive layer 8 and the second conductive layer 9, which are disposed on the opposite surfaces of the transparent insulating substrate 5 and constitute the first electrodes 11 and the second electrodes 21, respectively, include the first mesh pattern M1 and the second mesh pattern M2, respectively, and form the predetermined mesh pattern S. Therefore, in a case where the touch panel 2 using the conductive film 1 for a touch panel is used in combination with a liquid crystal display device or the like, the occurrence of moire caused by interference with a pixel pattern of the liquid crystal display device can be reduced, and the occurrence of noise can be suppressed.

In a case where the touch panel 2 is configured using the conductive film 1 for a touch panel, the same effects can be obtained irrespective of whether the first mesh pattern M1 or the second mesh pattern M2 is disposed on the visible side.

As described above, in a case where the opening ratio of the first mesh pattern M1 is lower than the opening ratio of the second mesh pattern M2, the sheet resistance of the first electrode 11 can be made to be lower than the sheet resistance of the second electrode 21. In this case, it is preferable that the first electrodes 11 are disposed on the display device side and are used as a driving electrode of the touch panel 2 and that the second electrodes 21 are disposed on the visible side and are used as a detecting electrode of the touch panel 2. By using the first electrodes 11 having a low sheet resistance, an effect of shielding electromagnetic noise emitted from the display device can be obtained, and the detection sensitivity of the touch panel can be further improved. In particular, in a case where a difference between the opening ratio of the second mesh pattern M2 and the opening ratio of the first mesh pattern M1 is 0.5% or higher, the effect of shielding the electromagnetic noise is particularly significant, and the detection sensitivity of the touch panel can be significantly improved.

Examples of a method of bonding the touch panel 2 and the display device include a method (direct bonding method) of directly bonding the touch panel 2 and the display device using a transparent pressure sensitive adhesive and a method (air gap method) of bonding only peripheries of the touch panel 2 and the display device using a double-sided tape. Among these, any method can be used. In a case where the touch panel 2 and the display device are bonded, a separate protective film may be provided on the conductive member 6B or the protective layer 7B. As the protective film, for example, a hard coated PET film (thickness: 20 to 150 μm) may be used, and the protective film may be bonded to the conductive member 6B or the protective layer 7B using an optical transparent adhesive sheet (optical clear adhesive).

As the transparent pressure sensitive adhesive used in the direct bonding method, as in the above-described transparent pressure sensitive adhesive 4, an optical transparent adhesive sheet (optical clear adhesive) or an optical transparent adhesive resin (optical clear resin) can be used, and the thickness thereof is preferably 10 μm to 100 μm. As the optical transparent adhesive sheet, for example, 8146 series (manufactured by 3M) can also be preferably used. It is preferable that the relative dielectric constant of the transparent pressure sensitive adhesive used in the direct bonding method is lower than that of the above-described transparent pressure sensitive adhesive 4 from the viewpoint of improving the detection sensitivity of the touch panel 2. The relative dielectric constant of the transparent pressure sensitive adhesive used in the direct bonding method is preferably 2.0 to 3.0.

In FIG. 5, in the mesh pattern S, the area of the openings surrounded by the first thin metal wire 15 and the second thin metal wire 25 is not particularly limited and, from the viewpoint of the uniformity of the transmittance of the conductive film, is preferably 0.0056 $mm^2$ or more and more preferably 0.0225 $mm^2$ or more. From the viewpoint of further improving the effects of the present invention, the standard deviation of the area of the openings is preferably 0.017 $mm^2$ to 0.050 $mm^2$ and more preferably 0.017 $mm^2$ to 0.038 $mm^2$.

In addition, from the viewpoint of further improving the effects of the present invention, a value of the active area S1 obtained in evaluation of opening ratio uniformity described below is preferably 0.4% or lower.

In the evaluation of opening ratio uniformity, in ten arbitrary 3.0 mm×3.0 mm observation areas of the active area S1, opening ratios of the mesh pattern S, which is formed of the first thin metal wire 15 and the second thin metal wire 25, are obtained, and a difference between a maximum value and a minimum value among the obtained opening ratios is obtained.

By adjusting the value obtained in the evaluation of opening ratio uniformity to be 0.4% or lower, in a case where the conductive film for a touch panel according to the present invention is disposed on the display device and used, the luminance in a display area of the display device can be uniformly maintained.

In addition, from the viewpoint of further improving the effects of the present invention, the visible light reflectivity of each of a visible side surface of the first thin metal wire 15 and a visible side surface of the second thin metal wire 25 is preferably 5% or lower and more preferably lower than 1%. By adjusting the visible light reflectivity to be in the above-described range, mesh appearance or haze can be effectively reduced.

A method of measuring the visible light reflectivity is as follows. First, using an ultraviolet-visible spectrophotometer V660 (manufactured by JASCO Corporation; a single reflection measurement unit SLM-736), a reflection spectrum is measured at a measurement wavelength of 350 nm to 800 nm and an incidence angle of 5 degrees. Specularly reflected light of an aluminum vapor deposition plane mirror is set as a baseline. Based on the reflection spectrum, a Y value in a 2 degree field of view of a D65 light source in the XYZ color system (color-matching function JIS Z 9701-1999) was calculated as the visible light reflectivity using a color calculation program (manufactured by JASCO Corporation).

As a material constituting the first thin metal wire 15 and the second thin metal wire 25, a metal such as silver, aluminum, copper, gold, molybdenum, or chromium, or an alloy thereof can be used, and this material can be used in the form of a single layer or a laminate. The first thin metal wire 15 and the second thin metal wire 25 may be straight, bent, curved, or wavy. In addition, the thickness of the first thin metal wire 15 and the second thin metal wire 25 is preferably 0.1 μm or more from the viewpoint of resistance value and is preferably 3 μm or less from the viewpoint of visibility from an oblique direction. It is more preferable that the thickness of the first thin metal wire 15 and the second thin metal wire 25 is ½ or less of the line width of the thin metal wire from the viewpoint of visibility from an oblique direction and the viewpoint of patternability. Further, in order to reduce the visible light reflectivity of the first thin metal wire 15 and the second thin metal wire 25, a blackening layer may be provided on the visible side of the first thin metal wire 15 and the second thin metal wire 25.

Using the material constituting the first thin metal wire 15, the conductive member 6A including the first electrodes 11, the first peripheral wirings 12, the first external connection terminals 13, and the first connector portions 14 can be formed. Accordingly, all the components of the conductive member 6A including the first electrodes 11, the first peripheral wirings 12, the first external connection terminals 13, and the first connector portions 14 can be formed of the same metal, can be made to have the same thickness, and can be formed at the same time.

The same shall be applied to the conductive member 6B including the second electrodes 21, the second peripheral wirings 22, the second external connection terminals 23, and the second connector portions 24.

The sheet resistance of the first electrode 11 and the second electrode 21 is preferably 0.1 Ω/sq to 200 Ω/sq and, particularly in a case where the conductive film is used as a projected capacitive touch panel, is preferably 10 Ω/sq to 100 Ω/sq.

In addition, from the viewpoint of further improving the effects of the present invention, the transmittance of the active area S1 of the conductive film 1 for a touch panel is preferably 85% or higher and more preferably 90% or higher.

In addition, from the viewpoint of further improving the effects of the present invention, the haze of the active area S1 of the conductive film 1 for a touch panel is preferably lower than 10% and more preferably lower than 5%.

By using the conductive film for a touch panel having a transmittance and haze in the above-described ranges, a touch panel having superior visible properties can be provided.

(Method of Designing Mesh Pattern)

Here, a method of designing the first mesh pattern M1 and the second mesh pattern M2 which satisfy the above-described requirements is not particularly limited. For example, the method of designing the first mesh pattern M1 and the second mesh pattern M2 will be described below.

Figure 6A:
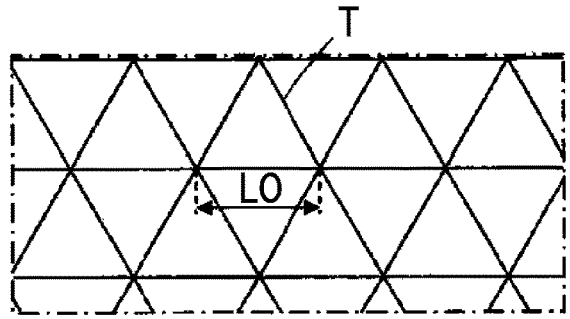
FIGS. 6A to 6F are diagrams showing a method of designing a mesh pattern of a conductive film for a touch panel in order of steps.

First, as shown in FIG. 6A, a plurality of regular triangles T having a preset initial inter-apex distance L0 are tightly disposed in the active area S1. Here, the initial inter-apex distance L0 corresponds to the length of one side of the regular triangle T.

Figure 6D:
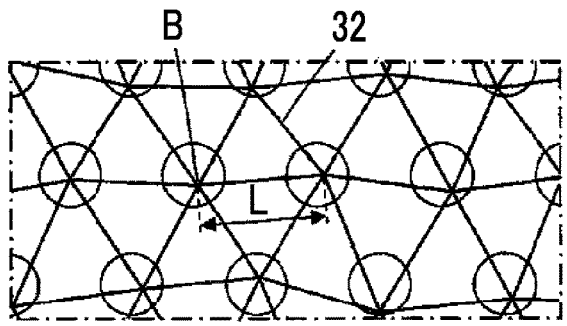
Figure 6B:
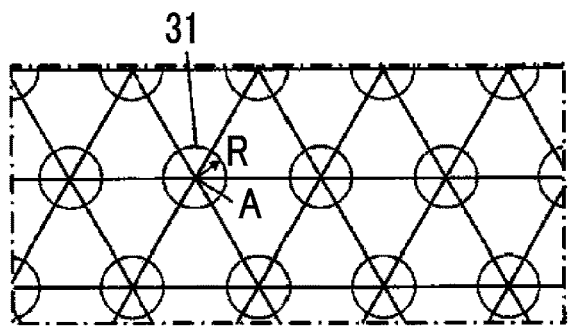

Next, a movement tolerance R of each apex of the regular triangles T is set, a circle 31 formed around an apex A of each of the regular triangles T and having a radius R is assumed as shown in FIG. 6B, and the apex A of each of the regular triangles T moves in the range of the movement tolerance R of the apex using a random number. As a result, a new apex B is created as shown in FIG. 6C. By connecting the new apexes B to each other as shown in FIG. 6D, a plurality of triangles 32 having a random shape are formed. The triangles 32 are set as the first cells C1 of the first mesh pattern M1. Here, the distance between apexes B adjacent to each other is set as an inter-apex distance L. The lengths of the sides of the triangles 32 are configured as various inter-apex distances L.

The movement tolerances R of the apexes are factors for determining the randomness of the triangles 32.

Figure 6E:
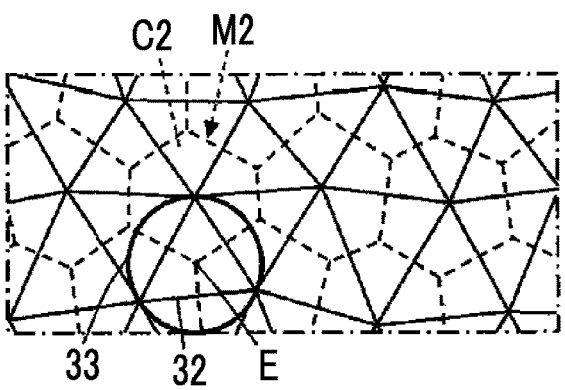
Figure 6C:
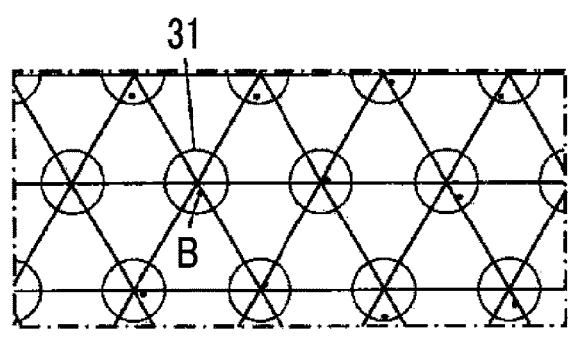

As shown in FIG. 6E, a circumcenter E that is the center of a circumscribed circle 33 is obtained from each of the triangles 32 having a random shape. Polygons obtained by connecting the circumcenters E to each other are set as the second cells C2 of the second mesh pattern M2. That is, the second cells C2 are formed by drawing a perpendicular bisector of each side of each of the triangles 32. At this time, one side of the first cell C1 intersects with one side of the second cell C2 by an angle of 90 degrees.

Figure 6F:
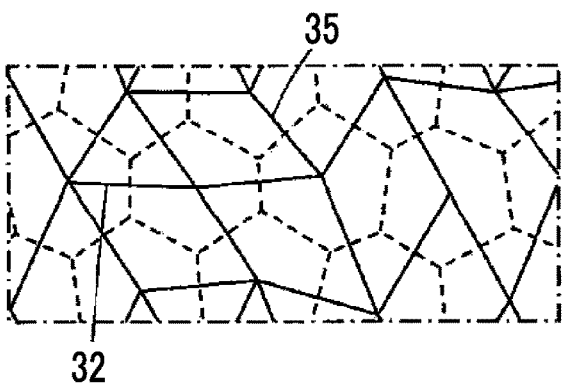

Further, optionally, as shown in FIG. 6F, in consideration of the line widths of the first thin metal wire 15 and the second thin metal wire 25, at least portions of adjacent triangles 32 are merged to form polygons 35 having four or more apexes. The triangles 32 and the polygons 35 may be set as the first cells C1 of the first mesh pattern M1.

Here, the step of "merging at least portions of adjacent triangles 32 to form polygons 35 having four or more apexes" will be called "merging". The merging can be used as means for adjusting the opening ratio of the first mesh pattern M1. FIG. 6F shows an example in which the first mesh pattern M1 of FIG. 6E which is formed of the first cells C1 including mainly the triangles is converted by merging into the first mesh pattern M1 which is formed of the first cells C1 including mainly the triangles and the quadrangles. The opening ratio of the first mesh pattern M1 of FIG. 6F is higher than the opening ratio of the first mesh pattern M1 of FIG. 6E.

This way, the first mesh pattern M1 and the second mesh pattern M2 shown in FIG. 3 can be designed.

As shown in FIG. 6D, the triangles 32 having a random shape are formed using the new apexes B which are created by moving the apexes A of the regular triangles T in the range of the movement tolerances R. Therefore, in a case where an average value La of the inter-apex distances L, which are the distances between the apexes B adjacent to each other in the first cells C1 in the designed first mesh pattern M1, is calculated, a maximum difference Dmax between an arbitrary inter-apex distance L and the average value La of the inter-apex distances is at most twice the movement tolerance R of each of the apexes A. It is preferable that the number of samples of the inter-apex distances for calculating the average value is as much as possible. For example, the average value can be obtained using 100 inter-apex distances in the active area S1. The average value La of the inter-apex distances substantially matches with the initial inter-apex distance L0.

Specifically, it is preferable that the first cells C1 of the first mesh pattern M1 have a shape which is created to satisfy the following conditions: the initial inter-apex distance L0 shown in FIG. 6A is 100 to 1600 µm; and the movement tolerance R of the apex shown in FIG. 6A is 25 to 250 µm. In this case, the first cells C1 of the first mesh pattern M1 are designed to have a random polygonal shape in which the average value La of the inter-apex distances L is 100 to 1600 µm; and in which the maximum difference between an arbitrary inter-apex distance L, which is the distance of adjacent apexes B, and the average value La of the inter-apex distances is 50 to 500 µm.

In a case where the average line width of the thin metal wires is in a range of 1.1 µm to 2.7 µm, it is particularly preferable that the initial inter-apex distance L0 is 300 to 900 µm and that the movement tolerance R of the apex is 0.15 times to 0.25 times the initial inter-apex distance L0. In this case, the first cells C1 of the first mesh pattern M1 are designed to have a random polygonal shape in which the average value La of the inter-apex distances L which are distances between adjacent apexes B is 300 to 900 µm and in which the maximum difference between an arbitrary inter-apex distance L and the average value La of the inter-apex distances is 0.30 to 0.50 times the initial inter-apex distance L0.

By adjusting the initial inter-apex distance L0 and the movement tolerance R of the apex to be in the above-described ranges, even in a case where the conductive film 1 for a touch panel is used in combination with various display devices having different resolutions, the occurrence of moire can be effectively reduced, the occurrence of noise can be effectively suppressed, and the detection sensitivity can be effectively made uniform.

Figure 7:
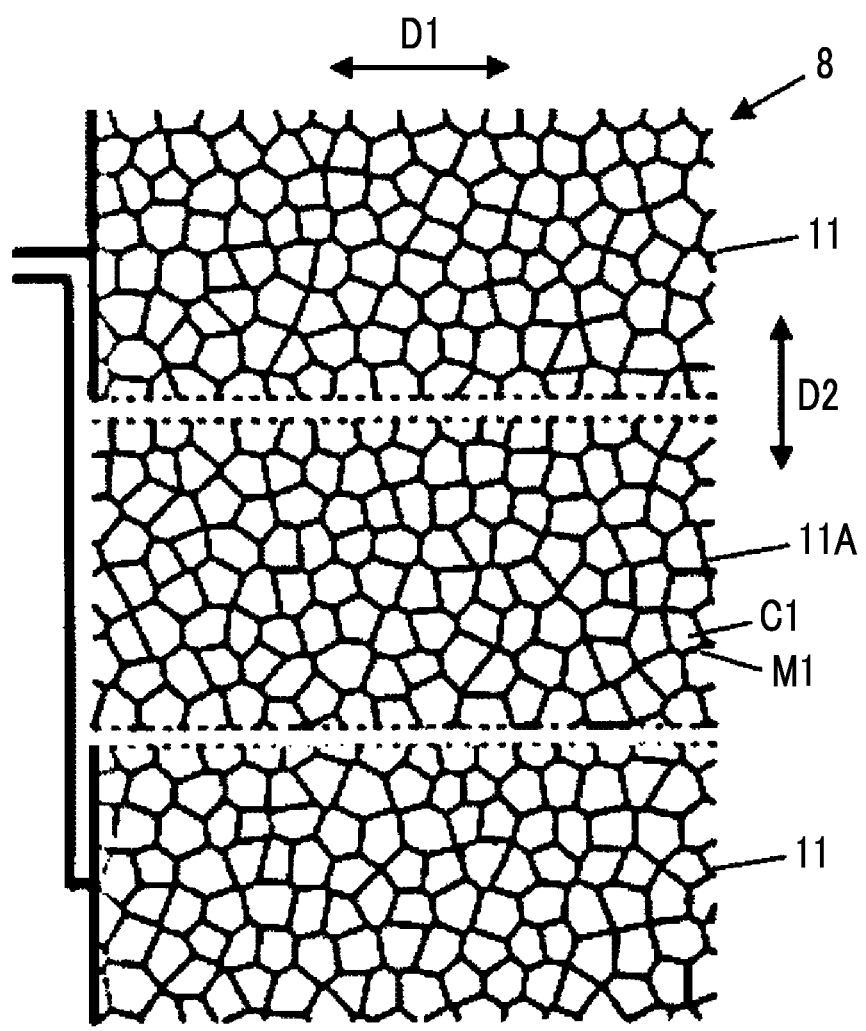
FIG. 7 is a diagram showing first electrodes and first dummy electrodes.

As shown in FIG. 7, the first conductive layer 8, which is disposed on the front surface of the transparent insulating substrate 5 in the active area S1, may include a plurality of first dummy electrodes 11A which are disposed between the first electrodes 11. The first dummy electrodes 11A are insulated from the first electrodes 11 and, as in the case of the first electrodes 11, includes the first mesh pattern M1 which is formed of a plurality of first cells C1 having a polygonal shape.

The first electrode 11 and the first dummy electrode 11A adjacent thereto are electrically insulated from each other by providing a disconnected portion having a width of 5 µm to 30 µm in the thin metal wire disposed along the continuous first mesh pattern M1. FIG. 7 shows a shape in which the disconnected portion is formed only in a boundary line between the first electrode 11 and the first dummy electrode 11A adjacent thereto. However, the disconnected portion may be formed in some or all of the sides of the first cells C1 in the first dummy electrode 11A.

In addition, although not shown in the drawings, the second conductive layer 9, which is disposed on the back surface of the transparent insulating substrate 5 in the active area S1, may include a plurality of second dummy electrodes which are disposed between the second electrodes 21. The second dummy electrodes are insulated from the second electrodes 21 and, as in the case of the second electrodes 21, includes the second mesh pattern M2 which is formed of a plurality of second cells C2 having a polygonal shape.

The second electrode 21 and the second dummy electrode adjacent thereto are electrically insulated from each other by providing a disconnected portion having a width of 5 µm to 30 µm in the thin metal wire disposed along the continuous second mesh pattern M2. The disconnected portion may be formed only in a boundary line between the second electrode 21 and the second dummy electrode adjacent thereto. However, the disconnected portion may be formed in some or all of the sides of the second cells C2 in the second dummy electrode.

As described above, the conductive film 1 for a touch panel is manufactured using a method including: forming the conductive member 6A including the first electrodes 11, the first peripheral wirings 12, the first external connection terminals 13, and the first connector portions 14 on the front surface of the transparent insulating substrate 5; and forming the conductive member 6B including the second electrodes 21, the second peripheral wirings 22, the second external connection terminals 23, and the second connector portions 24 on the back surface of the transparent insulating substrate 5.

At this time, the first electrodes 11 are formed of the first conductive layer 8 in which the first thin metal wire 15 disposed along the first mesh pattern M1, the second electrodes 21 are formed of the second conductive layer 9 in which the second thin metal wire 25 is disposed along the second mesh pattern M2, and the first conductive layer 8 and the second conductive layer 9 are disposed so as to overlap with each other with the transparent insulating substrate 5 interposed therebetween in the active area S1 as shown in FIG. 2.

A method of forming the conductive members 6A and 6B is not particularly limited. For example, the conductive members 6A and 6B can be formed by exposing a photosensitive material that includes an emulsion layer including a photosensitive silver halide salt and developing the exposed photosensitive material as described in paragraphs "0067" to "0083" of JP2012-185813A, paragraphs "0115" to "0126" of JP2014-209332A, or paragraphs "0216" to "0238" of JP2015-5495A.

In addition, the conductive members can also be formed using a method including: forming metal thin films on the front surface and the back surface of the transparent insulating substrate 5; patterning the metal thin films by printing a resist in a pattern shape on each of the metal thin films or by exposing a resist applied to the entire area of the metal thin films and developing the exposed resist; and etching metal of opening portions. Further, in addition to the above-described methods, a method of printing a paste including particles of the material constituting the conductive members on the front surface and the back surface of the transparent insulating substrate 5 and plating the paste with metal; a method using an ink jet method in which an ink including particles of the material constituting the conductive members is used; a method of printing an ink including particles of the material constituting the conductive members by screen printing; a method of forming a groove on the transparent insulating substrate 5 and applying a conductive ink to the groove; or a microcontact printing patterning method can be used.

Due to the presence of the first dummy electrodes 11A and the second dummy electrodes, even in spaces between the first electrodes 11 and spaces between the second electrodes 21, the first thin metal wire 15 disposed along the first mesh pattern M1 and the second thin metal wire 25 disposed along the second mesh pattern M2 overlap each other with the transparent insulating substrate 5 interposed therebetween. As a result, in a case where the touch panel 2 is used in combination with a liquid crystal display device or the like, the occurrence of moire can be reduced and the occurrence of noise can be suppressed over the entire active area S1.

In a case where the first dummy electrodes 11A and second dummy electrodes are present, the average line width of the first thin metal wire and the second thin metal wire and the opening ratio of the mesh pattern S can be calculated in consideration of the first dummy electrodes 11A and the second dummy electrodes.

In the above-described configuration, in the conductive film 1 for a touch panel, the conductive member 6A including the first electrodes 11, the first peripheral wirings 12, the first external connection terminals 13, and the first connector portions 14 is disposed on the front surface of the transparent insulating substrate 5, and the conductive member 6B including the second electrodes 21, the second peripheral wirings 22, the second external connection terminals 23, and the second connector portions 24 is disposed on the back surface of the transparent insulating substrate 5. However, the present invention is not limited to the above-described configuration.

For example, a configuration can also be adopted in which the conductive member 6A and the conductive member 6B are disposed on one surface of the transparent insulating substrate 5 with an interlayer insulator interposed therebetween.

Further, a configuration in which two substrates are provided can also be used. That is, a configuration can also be adopted in which the conductive member 6A is disposed on a surface of a first transparent insulating substrate, the conductive member 6B is disposed on a surface of a second transparent insulating substrate, and the first transparent insulating substrate and the second transparent insulating substrate are bonded using an optical transparent adhesive sheet (optical clear adhesive).

Further, instead of using the transparent insulating substrate 5, a configuration can also be adopted in which the conductive member 6A and the conductive member 6B are disposed on a surface of the cover panel 3 shown in FIG. 1 with an interlayer insulator interposed therebetween.

A touch panel-equipped display device can be manufactured by using the conductive film 1 for a touch panel and a display device in combination.

The kind of the display device is not particularly limited, and examples thereof include a liquid crystal display device (LCD), an organic electroluminescence (organic EL) display device. Among these, for example, a display device having a resolution in a range of 106 to 423 ppi is preferably used. In particular, in a case where the conductive film 1 for a touch panel is used in combination with a display device having a high resolution of 300 ppi or higher, the occurrence of moire and noise can be significantly reduced.

As described above, the conductive film 1 for a touch panel according to the present invention can be used in combination with two or more display devices having different image patterns. That is, even in a case where the conductive film 1 for a touch panel in which the average line width of the first thin metal wire 15 and the second thin metal wire 25 and the opening ratio of the mesh pattern S are in the ranges of the present invention is applied to two or more display devices having different resolutions, the occurrence of moire and noise in each of the display devices can be suppressed.

That is, as described above, in the related art, it is necessary to design a mesh pattern according to each of display devices having different image patterns. However, even in a case where the conductive film for a touch panel according to the present invention having the specific mesh pattern is applied to each of two or more display devices having different image patterns, the occurrence of moire and noise in each of the display devices can be suppressed. Therefore, it is not necessary to design a mesh pattern according to each of the display devices. In other words, the conductive film for a touch panel (or the touch panel including the conductive film for a touch panel) having the mesh pattern, which is common to display devices having different resolutions in a range of 106 to 423 ppi, can be applied to the display devices having resolutions in the above-described range. The common mesh pattern denotes that the average line width of the first thin metal wire 15 and the second thin metal wire 25, the first mesh pattern, and the second mesh pattern are common, that is, the same.

That is, two or more display devices having different resolutions (preferably, display devices having different resolutions in a range of 106 to 423 ppi) are prepared, and the touch panel in which the average line width of the first thin metal wire and the second thin metal wire and the opening ratio of the mesh pattern are in the ranges of the present invention is applied to the two or more display devices. As a result, a touch panel display device group including two or more touch panel-equipped display devices can be manufactured.

In each of two or more touch panel-equipped display devices (touch panel-equipped display device group) manufactured using the above-described manufacturing method, the occurrence of moire and noise is suppressed.

EXAMPLES

The present invention will be described in more detail based on the following examples. Materials, used amounts, ratios, treatment details, treatment procedures, and the like shown in the following examples can be appropriately changed within a range not departing from the scope of the present invention. Accordingly, the scope of the present invention is not limited to the following specific examples.

Example 1

The first mesh pattern M1 and the second mesh pattern M2 were designed using the above-described design method such that the average line width of the first thin metal wire 15 and the second thin metal wire 25 was 2.0 μm, the initial inter-apex distance L0 when the regular triangles T were disposed was 500 μm, and the movement tolerance R of the apex was 100 μm. That is, a plurality of triangles having randomness were formed based on the movement tolerance R of the apex, and circumcenters of the triangles were connected to each other. As a result, the second cells C2 of the second mesh pattern M2 were formed, and the first cells C1 of the first mesh pattern M1 were formed using the triangles.

In order to design a mesh pattern, a unit mesh pattern having a size of 5.0 mm×5.0 mm, which was the minimum electrode pitch, was formed, and the entire mesh pattern in the active area was formed by repeatedly using the unit mesh pattern.

The first conductive layer 8 in which the first thin metal wire 15 was disposed along the first mesh pattern M1 and the second conductive layer 9 in which the second thin metal wire 25 was disposed along the second mesh pattern M2 were disposed to overlap with each other in the transparent active area S1. As a result the conductive film 1 for a touch panel shown in FIG. 2 was manufactured.

A pattern in which the dummy electrodes were used as shown in FIG. 7 was adopted between the first electrodes 11 and the second electrodes 21 such that the width of the first electrodes 11 was 4.0 mm, the electrode pitch was 5.0 mm, the width of the second electrodes 21 was 2.0 mm, the electrode pitch was 5.0 mm, the line width of the first peripheral wirings 12 and the second peripheral wirings 22 was 30 μm, and the minimum inter-wiring distance was 20 μm. A disconnected portion having a width of 10 μm was formed in a boundary portion between the electrode and the dummy electrode to electrically insulate the electrode and the dummy electrode from each other. In the prepared conductive film 1 for a touch panel, the average line width of the first thin metal wire and the second thin metal wire and the opening ratio of the mesh pattern S are shown in Table 1 below.

Regarding a specific method of preparing the conductive members 6A and 6B (the first conductive layer 8 and the second conductive layer 9), a conductive film for a touch panel having a thickness of 0.8 μm, formed of silver, and including the electrodes, the dummy electrodes, connector portions, peripheral wirings, and external connection terminals was formed by exposing a photosensitive material including an emulsion layer having a photosensitive silver halide salt described below and developing the exposed photosensitive material.

(Preparation of Silver Halide Emulsion)

The following solution 2 and the following solution 3 were simultaneously added for 20 minutes to the following solution 1 held at pH 4.5 and 38° C. in amounts corresponding to 90% of the entire amounts while stirring the solutions. As a result, nuclear particles having a size of 0.16 μm were formed. Next, the following solution 4 and the following solution 5 were added for 8 minutes, and the remaining 10% amounts of the solution 2 and the solution 3 were further added for 2 minutes. As a result, the nuclear particles grew to a size of 0.21 μm. Further, 0.15 g of potassium iodide was added, and the particles were aged for 5 minutes. Then the formation of the particles was completed.

Solution 1
 Water: 750 ml
 Gelatin: 8.6 g
 Sodium chloride: 3 g
 1,3-Dimethylimidazolidine-2-thione: 20 mg
 Sodium benzenethiolsulfonate: 10 mg
 Citric acid: 0.7 g Solution 2
 Water: 300 ml
 Silver nitrate: 150 g Solution 3
 Water: 300 ml
 Sodium chloride: 38 g
 Potassium bromide: 32 g
 Potassium hexachloroiridate (III) (0.005% KCl 20% aqueous solution): 8 ml
 Ammonium hexachlororhodate (0.001% NaCl 20% aqueous solution): 10 ml Solution 4
 Water: 100 ml
 Silver nitrate: 50 g Solution 5
 Water: 100 ml
 Sodium chloride: 13 g
 Potassium bromide: 11 g
 Potassium ferrocyanide: 5 mg Next, the particles were washed with water by flocculation using an ordinary method. Specifically, the temperature was decreased to 35° C., and the pH was decreased (to be in a range of pH 3.6±0.2) using sulfuric acid until silver halide precipitated. Next, about 3 L of the supernatant liquid was removed (first water washing). Further, 3 L of distilled water was added, and sulfuric acid was added until silver halide precipitated. Next, about 3 L of the supernatant liquid was removed again (second water washing). By repeating the same operation as the second washing once more (third water washing), the water washing and desalting step was completed. After the water washing and desalting, the emulsion was adjusted to pH 6.4 and pAg 7.5, 3.9 g of gelatin, 10 mg of sodium benzenethiolsulfonate, 3 mg of sodium benzenethiolsulfinate, 15 mg of sodium thiosulfate, and 10 mg of chloroauric acid were added, and chemosensitization was performed at 55° C. to obtain the optimum sensitivity. Next, 100 mg of 1,3,3a,7-tetraazaindene as a stabilizer and 100 mg of PROXEL (trade name, manufactured by ICI Co., Ltd.) as a preservative were added. The finally obtained emulsion was a silver chloroiodobromide cubic particle emulsion having an average particle size of 0.22 μm and a coefficient of variation of 9%, in which the content of silver iodide was 0.08 mol %, and the ratio of silver chlorobromide was 70 mol % of silver chloride/30 mol % of silver bromide.

(Preparation of Composition for Forming Photosensitive Layer)

$1.2 \times 10^{-4}$ mol/mol Ag of 1,3,3a,7-tetraazaindene, $1.2 \times 10^{-2}$ mol/mol Ag of hydroquinone, $3.0 \times 10^{-4}$ mol/mol Ag of citric acid, and 0.90 g/mol Ag of 2,4-dichloro-6-hydroxy-1,3,5-triazine sodium salt were added to the emulsion, and pH was adjusted to 5.6 using citric acid. As a result, a coating solution was obtained.

A polymer latex including a polymer represented by (P-1) shown below as an example and a dispersant formed of dialkylphenyl PEO sulfuric acid ester (a mass ratio dispersant/polymer was 2.0/100=0.02) was added to the coating solution such that a mass ratio polymer/gelatin of the polymer to the gelatin in the coating solution was 0.5/1.

Further, EPDXY RESIN DY022 (trade name, manufactured by Nagase ChemteX Corporation) as a crosslinking agent was added. The addition amount of the crosslinking agent was adjusted such that the amount of the crosslinking agent in the photosensitive layer described below was 0.09 g/m$^2$.

This way, the composition for forming a photosensitive layer was prepared.

The polymer represented by (P-1) shown below as an example was synthesized with reference to JP3305459B and JP3754745B.

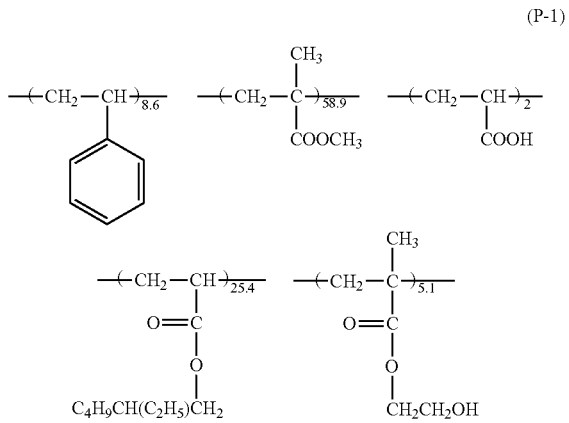

(P-1)

(Photosensitive Layer Forming Step)

A corona discharge treatment was performed on a transparent insulating substrate (PET having a thickness of 38 μm), and the polymer latex was applied to opposite surfaces of the transparent insulating substrate to form an undercoat layer having a thickness of 0.05 μm. Further, an antihalation layer (thickness: 1.0 μm) formed of a mixture of the polymer latex and gelatin [the mixing mass ratio (polymer/gelatin) was 2/1)] was provided on the undercoat layer, the antihalation layer including a dye having an optical density of about 1.0 and decolorized by an alkali developer. The composition for forming a photosensitive layer was applied to the antihalation layer, and a composition for forming a protective layer obtained by mixing the polymer latex and gelatin was further applied thereto to form a protective layer having a thickness of 0.15 μm. As a result, a transparent insulating substrate having opposite surfaces on which the photosensitive layer was formed was obtained. The mixing mass ratio (polymer/gelatin) of the polymer to the gelatin in the composition for forming a protective layer was 0.1/1. A resin substrate having opposite surfaces on which the photosensitive layer was formed was set as a film A. In the formed photosensitive layer, the silver content was 6.0 g/m$^2$, and the gelatin content was 0.9 g/m$^2$.

(Exposure Development Step)

Opposite surfaces of the film A were exposed using parallel light of a high pressure mercury lamp as a light source through photomasks corresponding to patterns of the conductive members. After the exposure, the surfaces of the film A were developed using the following developer and were developed using a fixing solution (trade name; N3X-R for CN16X, manufactured by Fuji Film Co., Ltd.). Further, the film A was rinsed with pure water and was dried. As a result, a resin substrate having opposite surfaces on which the conductive member formed of Ag wire and the gelatin layer were formed was obtained. The gelatin layer was formed between the Ag wires. The obtained film was set as a film B.

(Composition of Developer)

1 L of the developer included the following compounds.
Hydroquinone: 0.037 mol/L
N-methylamino phenol: 0.016 mol/L
Sodium metaborate: 0.140 mol/L
Sodium hydroxide: 0.360 mol/L
Sodium bromide: 0.031 mol/L
Potassium metabisulfite: 0.187 mol/L (Heating Step)

The film B was left to stand in a superheated steam bath at 120° C. for 130 seconds to heat the film B. The heated film was set as a film C.

(Gelatin Decomposition Treatment)

The film C was dipped in an aqueous solution (concentration of protease: 0.5 mass %; liquid temperature: 40° C.) of protease (BIOPRASE AL-15FG, manufactured by Nagase ChemteX Corporation) for 120 seconds. The film C was taken out from the aqueous solution, was dipped in warm water (liquid temperature: 50° C.) for 120 seconds, and was washed. The film having undergone the gelatin decomposition treatment was set as a film D.

(Calendering Treatment)

As a mat member for a calendering treatment, a stainless steel plate having a surface shape of Ra=0.28 μm and Sm=1.87 μm was used, and a calender device including a metal roller having a mirror-polished surface and a resin roller was used. The film D was calendered using the stainless steel plate and the calender under a jack pressure of 11.4 MPa while transporting the film D at a rate of 120 mm/min. The calendered film was set as a film E.

(Heat Treatment)

The film E was left to stand in a superheated steam bath at 120° C. for 130 seconds to heat the film E. The heated film was set as a film F. This film F was the conductive film 1 for a touch panel.

Examples 2 to 41 and Comparative Examples 1 to 18

Conductive films for a touch panel were prepared using the same method as in Example 1, except that the designs of the first mesh pattern M1 and the second mesh pattern M2 were changed such that the average line width and the opening ratio of the mesh pattern S were as shown below in Table 1.

In Example 7, merging was performed on the first mesh pattern M1 of Example 1, in which some of triangular cells constituting the first cells C1 were merged to form quadrangular cells such that the first mesh pattern M1 formed of the first cells C1 including the triangular cells and the quadrangular cells was formed.

Examples on which merging was performed on the first mesh pattern M1 as in Example 7 are shown as "Performed" in "Merging" of Table 1, and examples on which merging was not performed on the first mesh pattern M1 as in Example 1 are shown as "Not Performed" in "Merging" of Table 1.

As shown in Table 1, in the conductive films for a touch panel according to Comparative Examples 15 to 18, the first mesh pattern M1 and the second mesh pattern M2 were fixed patterns (the shape of openings was a lozenge shape, and the length of one side of the opening was 600 μm).

As a result of measuring the reflectivities of the visible sides of the thin metal wires according to Examples 1 to 41 and Comparative Examples 1 to 18, all the values measured from the thin metal wire side were 0.6%, and all the values measured from the transparent insulating substrate (PET) side were 0.8%.

It was found that, in the mesh patterns S as random mesh patterns according to Examples 1 to 41 and Comparative Examples 1 to 14, the number of extending directions of sides of the cells C were 10 or more, shapes of all the adjacent cells C were different from each other, and each of the second cells C2 in the second mesh pattern M2 included one apex of the first cells C1 in the first mesh pattern M1.

In addition, among the mesh patterns S as random mesh patterns according to Examples 1 to 41 and Comparative Examples 1 to 14, in the mesh patterns S on which merging was not performed, quadrangular cells accounted for 90% or higher in all the cells, and in the mesh patterns S on which merging was performed, quadrangular cells and pentagonal cells accounted for 90% or higher in all the cells.

<Determination of Average Line Width and Opening Ratio>

In a 35 mm square portion (quadrangular portion: length 35 mm×width 35 mm) positioned at the center of the active area S1 of the conductive film for a touch panel according to each of Examples and Comparative Examples, a 30 mm square (length 30 mm×width 30 mm) portion positioned at the center was divided into nine 10 mm square (length 10 mm×width 10 mm) areas. The average line width of the first thin metal wire and the second thin metal wire, and the opening ratio of the mesh pattern S formed of the first thin metal wire and the second thin metal wire were obtained from each of the nine areas. Next, the average line widths and the opening ratios obtained from the nine areas were averaged. As a result, the average line width of the first thin metal wire and the second thin metal wire, and the opening ratio of the mesh pattern S shown in Table 1 were obtained.

The average line width and the opening ratio in each of the areas was measured as follows.

(Method of Measuring Line Width)

In one area, three line widths of the first thin metal wire and three line widths of the second thin metal wire were measured, and the average value thereof was set as the average line width of the area.

(Method of Measuring Opening Ratio)

In order to obtain the opening ratio in each of the 10 mm square (length 10 mm×width 10 mm) areas, the mesh pattern S (refer to FIG. 4) formed of the first thin metal wire and the second thin metal wire in the entire 10 mm square area was imaged with an optical microscope, and the opening ratio of the mesh pattern S was calculated based on the image data.

During the measurement of the opening ratio, the opening ratio of the first mesh pattern and the opening ratio of the second mesh pattern were also calculated. In Example 1, the opening ratio of the first mesh pattern was 98.6%, and the opening ratio of the second mesh pattern was 99.3%. In Example 7, the opening ratio of the first mesh pattern was 99.0%, and the opening ratio of the second mesh pattern was 99.3%.

Various Evaluations (Evaluation of Moire and Noise)

The conductive film for a touch panel according to each of Examples and Comparative Examples was disposed on four liquid crystal display devices (LCD) having different pixel sizes ("LCD1": 118 ppi, pixel pitch=215 "LCD2": 149 ppi, pixel pitch=170.4 "LCD3": 221 ppi, pixel pitch=114.9 µm, and "LCD4": 342 ppi, pixel pitch=74.2 µm) such that the second mesh pattern was positioned on the visible side. Using the four LCDs, moire and noise are evaluated.

Moire was evaluated based on the following standards.

"1": a high level where moire was not able to be recognized

"2": a level where there were no problems in moire in practice

"3": an NG level where moire was recognized

Noise was evaluated based on the following standards.

"1": a high level where noise was not observed

"2": a level where there were no problems in noise in practice

"3": an NG level where noise was recognized

In the evaluation of moire for the four LCDs, a case where all the results were "1" was evaluated as "A", a case where the results did not include "3" but included at least one "2" was evaluated as "B", and a case where the results included at least one "3" was evaluated as "C".

Likewise, in the evaluation of noise for the four LCDs, a case where all the results were "1" was evaluated as "A", a case where the results did not include "3" but included at least one "2" was evaluated as "B", and a case where the results included at least one "3" was evaluated as "C".

(Evaluation of Mesh Appearance)

The conductive film for a touch panel according to each of Examples and Comparative Examples was disposed on a black sheet and was irradiated with white light from the top. Two height positions at distances of 10 cm and 40 cm from the conductive film for a touch panel were observed by visual inspection at a depression angle of 45°, and the evaluation was performed based on the following standards.

"A": a high level where mesh appearance was not observed at the height of 40 cm and the height of 10 cm "B": a level where mesh appearance was not observed at the height of 40 cm but was slightly observed at the height of 10 cm, but there were no problems in practice "C": a level where the thin metal wire was conspicuous and mesh appearance was clearly observed at the height of 40 cm and the height of 10 cm, and there was a problem In "Mesh Pattern" of Table 1, "Random" represents that the mesh pattern S was a random pattern. That is, the number of extending directions of sides of the cells C in the mesh pattern S was 10 or more, and shapes of all the adjacent cells C were different from each other. In Examples, both the first mesh pattern M1 of the first conductive layer and the second mesh pattern M2 of the second conductive layer were random patterns. "Fixed" represents that all the shapes of the first cells C1 of the first mesh pattern M1 of the first conductive layer and the second cells C2 of the second mesh pattern M2 of the second conductive layer were a lozenge shape and that the shapes of the cells of the mesh pattern S formed of the first thin metal wire and the second thin metal wire were also a lozenge shape (a lozenge shape in which the length of one side of the first cells C1 and the second cells C2 was reduced to half). In Comparative Examples 15 to 18 corresponding to "Fixed", the number of extending directions of sides of the cell C was 2.

In Table 1, "Line Width" represents the average line width of the first thin metal wire and the second thin metal wire.

"Opening Ratio" represents the opening ratio of the mesh pattern S.

In "Section" of Table 1, "Section 1" represents a range surrounded by the line A-B, the line B-C, the line C-D, and the line A-D in FIG. 5, "Section 2" represents a range surrounded by the line A-E, the line E-F, the line F-G and the line A-G in FIG. 5, "Section 3" represents a range surrounded by the line J-K, the line K-D, and the line J-D in FIG. 5, and "Section 4" represents a range surrounded by the line J-H, the line H-F, the line F-I, and the line J-I in FIG. 5, "Out of Section" represents the result was outside of the range of the section 1.

In Table 1, for example, "Sections 2 and 4" represents that the result corresponds to both "Section 2" and "Section 4".

TABLE 1

| Table 1 | Mesh Pattern | Average Line Width (μm) | Opening Ratio (%) | Section | Initial Inter-Apex Distance L0 (μm) | Movement Tolerance R (μm) of Apex | Merging | Evaluation Moire | Noise | Mesh Appearance |
|---|---|---|---|---|---|---|---|---|---|---|
| Example 1 | Random | 2.0 | 97.9 | Sections 2 and 4 | 500 | 100 | Not Performed | A | A | A |
| Example 2 | Random | 2.0 | 98.4 | Sections 2 and 4 | 600 | 125 | Not Performed | A | A | A |
| Example 3 | Random | 2.0 | 98.6 | Sections 2 and 4 | 700 | 150 | Not Performed | A | A | A |
| Example 4 | Random | 2.0 | 98.9 | Sections 2 and 4 | 900 | 180 | Not Performed | A | A | A |
| Example 5 | Random | 2.0 | 96.8 | Sections 2 and 4 | 300 | 50 | Not Performed | A | A | A |
| Example 6 | Random | 2.0 | 97.5 | Sections 2 and 4 | 400 | 100 | Not Performed | A | A | A |
| Example 7 | Random | 2.0 | 98.3 | Sections 2 and 4 | 500 | 100 | Performed | A | A | A |
| Example 8 | Random | 2.0 | 99.1 | Sections 2 and 4 | 900 | 180 | Performed | A | A | A |
| Example 9 | Random | 2.0 | 97.1 | Sections 2 and 4 | 300 | 50 | Performed | A | A | A |
| Example 10 | Random | 2.5 | 97.2 | Sections 2 and 4 | 500 | 100 | Not Performed | A | A | A |
| Example 11 | Random | 2.5 | 98.6 | Sections 2 and 4 | 900 | 180 | Not Performed | A | A | A |
| Example 12 | Random | 2.5 | 97.8 | Sections 2 and 4 | 500 | 100 | Performed | A | A | A |
| Example 13 | Random | 2.5 | 98.9 | Sections 2 and 4 | 900 | 180 | Performed | A | A | A |
| Example 14 | Random | 1.5 | 96.7 | Sections 2 and 4 | 225 | 50 | Not Performed | A | A | A |
| Example 15 | Random | 1.5 | 97.5 | Sections 2 and 4 | 300 | 50 | Not Performed | A | A | A |
| Example 16 | Random | 1.5 | 98.7 | Sections 2 and 4 | 500 | 100 | Performed | A | A | A |
| Example 17 | Random | 1.5 | 99.3 | Sections 2 and 4 | 900 | 180 | Performed | A | A | A |
| Example 18 | Random | 1.2 | 96.6 | Sections 2 and 4 | 150 | 25 | Performed | A | A | A |
| Example 19 | Random | 1.2 | 98.0 | Sections 2 and 4 | 300 | 50 | Not Performed | A | A | A |
| Example 20 | Random | 1.2 | 99.5 | Sections 2 and 4 | 900 | 180 | Performed | A | A | A |
| Example 21 | Random | 2.7 | 98.5 | Sections 2 and 4 | 900 | 180 | Not Performed | A | A | A |
| Example 22 | Random | 2.0 | 95.5 | Section 1 | 220 | 50 | Not Performed | A | B | A |
| Example 23 | Random | 2.0 | 95.6 | Section 1 | 225 | 50 | Not Performed | A | B | A |
| Example 24 | Random | 2.0 | 95.9 | Section 1 | 240 | 50 | Not Performed | A | B | A |
| Example 25 | Random | 2.0 | 96.0 | Section 1 | 250 | 50 | Not Performed | A | B | A |
| Example 26 | Random | 2.0 | 96.1 | Section 1 | 220 | 50 | Performed | A | B | A |
| Example 27 | Random | 2.0 | 96.3 | Section 1 | 225 | 50 | Performed | A | B | A |
| Example 28 | Random | 2.0 | 96.5 | Section 1 | 240 | 50 | Performed | A | B | A |
| Example 29 | Random | 2.0 | 96.6 | Section 1 | 250 | 50 | Performed | A | B | A |
| Example 30 | Random | 3.0 | 99.3 | Sections 1 and 3 | 1600 | 200 | Performed | B | B | B |
| Example 31 | Random | 3.0 | 98.7 | Section 1 | 900 | 180 | Performed | B | B | A |
| Example 32 | Random | 3.0 | 97.9 | Section 1 | 700 | 150 | Not Performed | B | B | A |
| Example 33 | Random | 2.5 | 96.9 | Section 1 | 400 | 100 | Not Performed | A | B | A |
| Example 34 | Random | 2.5 | 96.4 | Section 1 | 300 | 50 | Performed | A | B | A |
| Example 35 | Random | 1.5 | 96.3 | Section 1 | 200 | 50 | Not Performed | A | B | A |
| Example 36 | Random | 1.5 | 94.9 | Section 1 | 140 | 25 | Performed | A | B | A |
| Example 37 | Random | 1.2 | 95.6 | Section 1 | 140 | 25 | Performed | A | B | A |
| Example 38 | Random | 1.2 | 94.9 | Section 1 | 100 | 25 | Performed | A | B | A |
| Example 39 | Random | 2.0 | 99.5 | Sections 2 and 3 | 1600 | 200 | Performed | A | A | B |
| Example 40 | Random | 2.5 | 99.4 | Sections 2 and 3 | 1600 | 200 | Performed | A | A | B |

TABLE 1-continued

| Table 1 | Mesh Pattern | Average Line Width (μm) | Opening Ratio (%) | Section | Initial Inter-Apex Distance L0 (μm) | Movement Tolerance R (μm) of Apex | Merging | Evaluation Moire | Noise | Mesh Appearance |
|---|---|---|---|---|---|---|---|---|---|---|
| Example 41 | Random | 1.5 | 99.6 | Sections 2 and 3 | 1600 | 200 | Performed | A | A | B |
| Comparative Example 1 | Random | 2.0 | 94.2 | Out of Section | 150 | 25 | Performed | A | C | A |
| Comparative Example 2 | Random | 2.0 | 95.3 | Out of Section | 200 | 50 | Performed | A | C | A |
| Comparative Example 3 | Random | 2.0 | 93.4 | Out of Section | 150 | 25 | Not Performed | A | C | A |
| Comparative Example 4 | Random | 2.0 | 93.3 | Out of Section | 140 | 25 | Performed | A | C | A |
| Comparative Example 5 | Random | 2.0 | 90.3 | Out of Section | 100 | 25 | Not Performed | A | C | A |
| Comparative Example 6 | Random | 3.0 | 96.7 | Out of Section | 510 | 100 | Not Performed | B | C | A |
| Comparative Example 7 | Random | 3.0 | 96.8 | Out of Section | 400 | 100 | Performed | B | C | A |
| Comparative Example 8 | Random | 3.0 | 96.3 | Out of Section | 400 | 100 | Not Performed | B | C | A |
| Comparative Example 9 | Random | 3.0 | 95.7 | Out of Section | 300 | 50 | Performed | B | C | A |
| Comparative Example 10 | Random | 2.5 | 95.8 | Out of Section | 250 | 50 | Performed | A | C | A |
| Comparative Example 11 | Random | 3.6 | 98.4 | Out of Section | 900 | 180 | Performed | B | C | A |
| Comparative Example 12 | Random | 3.6 | 99.1 | Out of Section | 1600 | 200 | Performed | B | C | B |
| Comparative Example 13 | Random | 1.5 | 94.5 | Out of Section | 130 | 25 | Performed | A | C | A |
| Comparative Example 14 | Random | 1.2 | 93.8 | Out of Section | 90 | 25 | Performed | A | C | A |
| Comparative Example 15 | Fixed | 2.5 | 98.3 | Section 2 | — | — | — | C | A | A |
| Comparative Example 16 | Fixed | 2.0 | 98.7 | Section 2 | — | — | — | C | A | A |
| Comparative Example 17 | Fixed | 3.0 | 98.0 | Section 1 | — | — | — | C | A | A |
| Comparative Example 18 | Fixed | 1.2 | 99.2 | Section 2 | — | — | — | C | A | A |

As shown in Table 1, it was found that, in a case where the conductive films for a touch panel according to the present invention is used, the desired effects can be obtained. In particular, in Examples 1 to 21 and 39 to 41 satisfying the relationship in the section 2, all the four LCDs were at a high level where both moire and noise were not able to be recognized. Further, the conductive films for a touch panel according to Examples 1 to 21 corresponding to the section 4 were at a significantly high level where mesh appearance was also suppressed.

Example 42

A mesh pattern was formed by combining the 5.0 mm×5.0 mm unit mesh pattern used in Example 1 and the 5.0 mm×5.0 mm unit mesh pattern used in Example 5. Under the same conditions as in Example 1 except for the mesh pattern, the preparation, the evaluation, the evaluation of opening ratio uniformity were performed.
(Result of Evaluation of Opening Ratio Uniformity)
In the conductive films for a touch panel according to Examples 1 to 41, all the results were 0.4% or lower. However, the result of conductive film for a touch panel according to Example 42 was 1.1%.
In the evaluations of moire, noise, and mesh appearance, the results of Example 42 were A. However, in a case where a white solid image was displayed using the display devices, unevenness in the luminance of the display devices were recognized as compared to the conductive films for a touch panel according to Examples 1 to 41.

In Examples, both the first mesh pattern M1 and the second mesh pattern M2 were random patterns, and the mesh pattern S formed by the overlapping of the first mesh pattern and the second mesh pattern was a random pattern. However, the present invention is not limited to this configuration. For example, one of the first mesh pattern M1 and the second mesh pattern M2 may be a random pattern, the other one may be a fixed pattern, and the mesh pattern S formed by the overlapping of the first mesh pattern and the second mesh pattern may be a random pattern. In this case, it is preferable that both the first mesh pattern M1 and the second mesh pattern M2 are random patterns from the viewpoint of easily forming the following mesh patterns including: a mesh pattern in which each of the second cells C2 in the second mesh pattern M2 includes one apex of the first cells C1 in the first mesh pattern M1, the mesh pattern having a configuration capable of reducing the parasitic capacitance, improving the detection sensitivity of the touch panel, reducing a variation between the areas of the openings of the polygonal cells C in the mesh pattern S, and reducing the roughness of the mesh; and a mesh pattern in which the sides of the first cells C1 intersect with the sides of the second cells C2 at an angle of 75 degrees to 90 degrees, the mesh pattern having a configuration capable of reducing the parasitic capacitance of overlapping portions between the first electrodes 11 and the second electrodes 21 and improving the detection sensitivity of the touch panel.

As the shape of the electrode pattern of the capacitive touch panel, in addition to the so-called bar and stripe electrode pattern shape shown in FIG. 2, for example, a so-called diamond pattern disclosed in FIG. 16 of WO2010/013679 or an electrode pattern shape disclosed in FIG. 7 or 20 of WO2013/094728 is also applicable, and further electrode patterns having other shapes of a capacitive touch panel are also applicable.

In addition, the touch panel can also be used in combination with other functional films. For example, the touch panel can be used in combination with a function film for improving an image quality disclosed in JP2014-13264A that includes a substrate having a high retardation value and prevents rainbow interference patterns, or can be used in combination with a circularly polarizing plate disclosed in JP2014-142462A for improving the visibility of electrodes of a touch panel.

EXPLANATION OF REFERENCES

1: conductive film for a touch panel
2: touch panel
3: support
4: pressure sensitive adhesive
5: transparent insulating substrate
6A, 6B: conductive member
7A, 7B: protective layer
8: first conductive layer
9: second conductive layer
11: first electrode
11A: first dummy electrode
12: first peripheral wiring
13: first external connection terminal
14: first connector portion
15: first thin metal wire
21: second electrode
22: second peripheral wiring
23: second external connection terminal
24: second connector portion
25: second thin metal wire
31, 32: triangle
33: circumscribed circle
35: polygon
S1: active area
S2: peripheral area
D1: first direction
D2: second direction
C: cell
C1: first cell
M1: first mesh pattern
C2: second cell
M2: second mesh pattern
T: regular triangle
A, B: apex
L0: initial inter-apex distance
R: movement tolerance of apex
L: inter-apex distance
E: circumcenter

What is claimed is:
1. A conductive sheet for a touch panel having an active area, the conductive sheet comprising:
a first conductive layer that is formed of a first thin metal wire disposed in the active area; and
a second conductive layer that is formed of a second thin metal wire disposed to overlap with the first conductive layer in the active area,
wherein a mesh pattern is formed of the first thin metal wire and the second thin metal wire in a case where the conductive sheet is seen from a direction perpendicular to the active area,
the mesh pattern is a random pattern,
an average line width of the first thin metal wire and the second thin metal wire is 1.1 μm to 2.7 μm, and
in a case where X represents the average line width of the first thin metal wire and the second thin metal wire, an opening ratio of the mesh pattern is $(95.2+X\times0.8)\%$ to $(99.95-X\times0.33)\%$.

2. The conductive sheet for a touch panel according to claim 1,
wherein the first conductive layer includes a first mesh pattern formed of a plurality of first cells,
the second conductive layer includes a second mesh pattern formed of a plurality of second cells, and
each of the second cells includes at most one apex of the first cells in a case where the conductive sheet is seen from the direction perpendicular to the active area.

3. The conductive sheet for a touch panel according to claim 1,
wherein the first conductive layer includes a first mesh pattern formed of a plurality of first cells,
the first mesh pattern is a random pattern,
the second conductive layer includes a second mesh pattern formed of a plurality of second cells, and
the second mesh pattern is a random pattern.

4. The conductive sheet for a touch panel according to claim 3,
wherein an opening ratio of the first mesh pattern is lower than an opening ratio of the second mesh pattern.

5. The conductive sheet for a touch panel according to claim 1,
wherein in a case where a difference between a maximum value and a minimum value among opening ratios of the mesh pattern, which are measured in ten 3.0 mm×3.0 mm observation areas of the active area, is obtained in evaluation of opening ratio uniformity, the value obtained from the evaluation of opening ratio uniformity is 0.4% or lower.

6. The conductive sheet for a touch panel according to claim 1,
wherein a visible light reflectivity of each of a visible side surface of the first thin metal wire and a visible side surface of the second thin metal wire is 5% or lower.

7. The conductive sheet for a touch panel according to claim 1, the conductive sheet further comprising
a substrate that includes a first surface and a second surface facing the first surface,
wherein the first conductive layer is disposed on the first surface, and
the second conductive layer is disposed on the second surface.

8. The conductive sheet for a touch panel according to claim 1,
wherein the first conductive layer forms a plurality of first electrodes and a plurality of first dummy electrodes,
the first electrodes are disposed at intervals,
the first dummy electrodes are disposed between the first electrodes and are insulated from the first electrodes, the second conductive layer forms a plurality of second electrodes and a plurality of second dummy electrodes, the second electrodes are disposed at intervals to intersect with the first electrodes, the second dummy electrodes are disposed between the second electrodes and are insulated from the second electrodes, and the first electrodes and the second electrodes are disposed in a state where the first electrodes and the second electrodes are insulated from each other.

9. A touch panel comprising:
the conductive sheet for a touch panel according to claim 1.

10. A touch panel-equipped display device comprising:
the touch panel according to claim 9; and
a display device having a resolution in a range of 106 to 423 ppi.

11. The touch panel-equipped display device according to claim 10,
wherein the touch panel includes a conductive sheet for a touch panel having a mesh pattern which is common to display devices having different resolutions in a range of 106 to 423 ppi.

\* \* \* \* \*